United States Patent
Toya

(10) Patent No.: US 9,748,778 B2
(45) Date of Patent: Aug. 29, 2017

(54) POWER SUPPLY APPARATUS

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 249 days.

(21) Appl. No.: 14/408,991

(22) PCT Filed: Aug. 21, 2013

(86) PCT No.: PCT/JP2013/004944
§ 371 (c)(1),
(2) Date: Dec. 18, 2014

(87) PCT Pub. No.: WO2014/030348
PCT Pub. Date: Feb. 27, 2014

(65) Prior Publication Data
US 2015/0145476 A1    May 28, 2015

(30) Foreign Application Priority Data
Aug. 24, 2012    (JP) ................. 2012-185427

(51) Int. Cl.
H02J 7/00    (2006.01)
H01M 10/44    (2006.01)
B60L 11/18    (2006.01)

(52) U.S. Cl.
CPC ......... *H02J 7/0042* (2013.01); *B60L 11/1811* (2013.01); *H01M 10/441* (2013.01);
(Continued)

(58) Field of Classification Search
CPC .................................................. H01M 10/441
(Continued)

(56) References Cited

U.S. PATENT DOCUMENTS

| | | |
|---|---|---|
| 2007/0025135 A1 | 2/2007 | Yamamoto et al. |
| 2008/0143290 A1* | 6/2008 | Chavakula ............ H02J 7/0055 320/101 |
| 2010/0114800 A1 | 5/2010 | Yasuda et al. |

FOREIGN PATENT DOCUMENTS

| | | |
|---|---|---|
| EP | 2 600 487 | 6/2013 |
| JP | 07-042547 | 8/1995 |

(Continued)

OTHER PUBLICATIONS

International Search Report issued Sep. 17, 2013 in International (PCT) Application No. PCT/JP2013/004944.

*Primary Examiner* — Thuan Do
(74) *Attorney, Agent, or Firm* — Wenderoth, Lind & Ponack, L.L.P.

(57) ABSTRACT

A power supply apparatus includes: a connection unit to which a battery pack is connected; a power conversion unit which converts direct current power output from the battery pack via the connection unit into a first power; a power plug which is connected to an external power source; a power supplying unit to which a power receiving unit of the external apparatus is connected to supply the first power output from the power conversion unit or a second power which is the power supplied from the external power source via the power plug; and a switching unit which switches between outputting the first power to the power supplying unit and outputting the second power to the power supplying unit.

29 Claims, 15 Drawing Sheets

(52) U.S. Cl.
CPC .......... *H02J 7/0027* (2013.01); *H02J 7/0045* (2013.01); *H02J 7/0052* (2013.01); *H02J 2007/0059* (2013.01); *H02J 2007/0062* (2013.01)

(58) Field of Classification Search
USPC ........................................................ 320/109
See application file for complete search history.

(56) References Cited

FOREIGN PATENT DOCUMENTS

| | | |
|---|---|---|
| JP | 07-274533 | 10/1995 |
| JP | 2722046 | 3/1998 |
| JP | 2000-023364 | 1/2000 |
| JP | 2000-224778 | 8/2000 |
| JP | 2001-028839 | 1/2001 |
| JP | 2002-208495 | 7/2002 |
| JP | 2003-174730 | 6/2003 |
| JP | 2006-296109 | 10/2006 |
| JP | 2007-043788 | 2/2007 |
| JP | 2008-108607 | 5/2008 |
| JP | 2009-11083 | 1/2009 |
| JP | 2009-274527 | 11/2009 |
| JP | 2010-074894 | 4/2010 |
| JP | 2010-108833 | 5/2010 |
| JP | 2012-080637 | 4/2012 |
| JP | 2012-85461 | 4/2012 |
| WO | 2012/014410 | 2/2012 |

\* cited by examiner

FIG. 13

| Position of switch | Mode 1 | | Mode 2 | | Mode 3 | |
|---|---|---|---|---|---|---|
| Status | Normal times | During power outage | Normal times | During power outage | Normal times | During power outage |
| Discharge | Discharge | Discharge | No discharge | No discharge | No discharge | Discharge |
| Charge | Unchargeable | Unchargeable | Chargeable | Unchargeable | Chargeable | Unchargeable | though  # POWER SUPPLY APPARATUS

TECHNICAL FIELD

The present invention relates to a power supply apparatus capable of supplying power to an electric apparatus and the like.

BACKGROUND ART

Preparation for a power outage or a planned power outage at the time of disaster has drawn more attention in recent years. For example, techniques have been studied for supplying power to a residence from a stationary battery system or an electric vehicle to prepare for a power outage at the time of disaster.

Furthermore, it has been known to use a portable power supply in which a battery and an inverter circuit are installed to use electric apparatuses which need commercial power outdoors, etc. (e.g., Patent Literature (PTL) 1).

CITATION LIST

Patent Literature

[PTL1] Japanese Patent No. 2722046

SUMMARY OF INVENTION

It is desirable to use power for a specific electric apparatus also for other electric apparatuses at the time of a power outage.

In view of this, the present invention provides a power supply apparatus which achieves efficient use of power for a specific electric apparatus.

A power supply apparatus according to an aspect of the present invention is a power supply apparatus which supplies power to an external apparatus by using a battery pack including a terminal unit which is electrically connectable to different types of a plurality of apparatuses, the power supply apparatus including: a connection unit to which the terminal unit of the battery pack is detachably connected; a power conversion unit which converts direct current power into first power, the direct current power being output from the terminal unit of the battery pack via the connection unit; a power plug for receiving power supplied from an external power source; a power supplying unit which supplies power to the external apparatus via a power receiving unit of the external apparatus through connection of the power receiving unit of the external apparatus to the power supplying unit; and a switching unit which switches between (i) outputting, to the power supplying unit, the first power output from the power conversion unit and (ii) outputting, to the power supplying unit, second power which is the power supplied from the external power source via the power plug.

These general or generic aspects may be implemented using a system, a method, an integrated circuit, a computer program, or a computer-readable recording medium such as a CD-ROM, or any combination of systems, methods, integrated circuits, computer programs, and computer-readable recording media.

The power supply apparatus according to the present invention enables effective use of power that is for a specific electric apparatus.

BRIEF DESCRIPTION OF DRAWINGS

FIG. 13 is a table for describing each mode of the portable power supply according to Embodiment 2.

DESCRIPTION OF EMBODIMENTS

Figure 1:
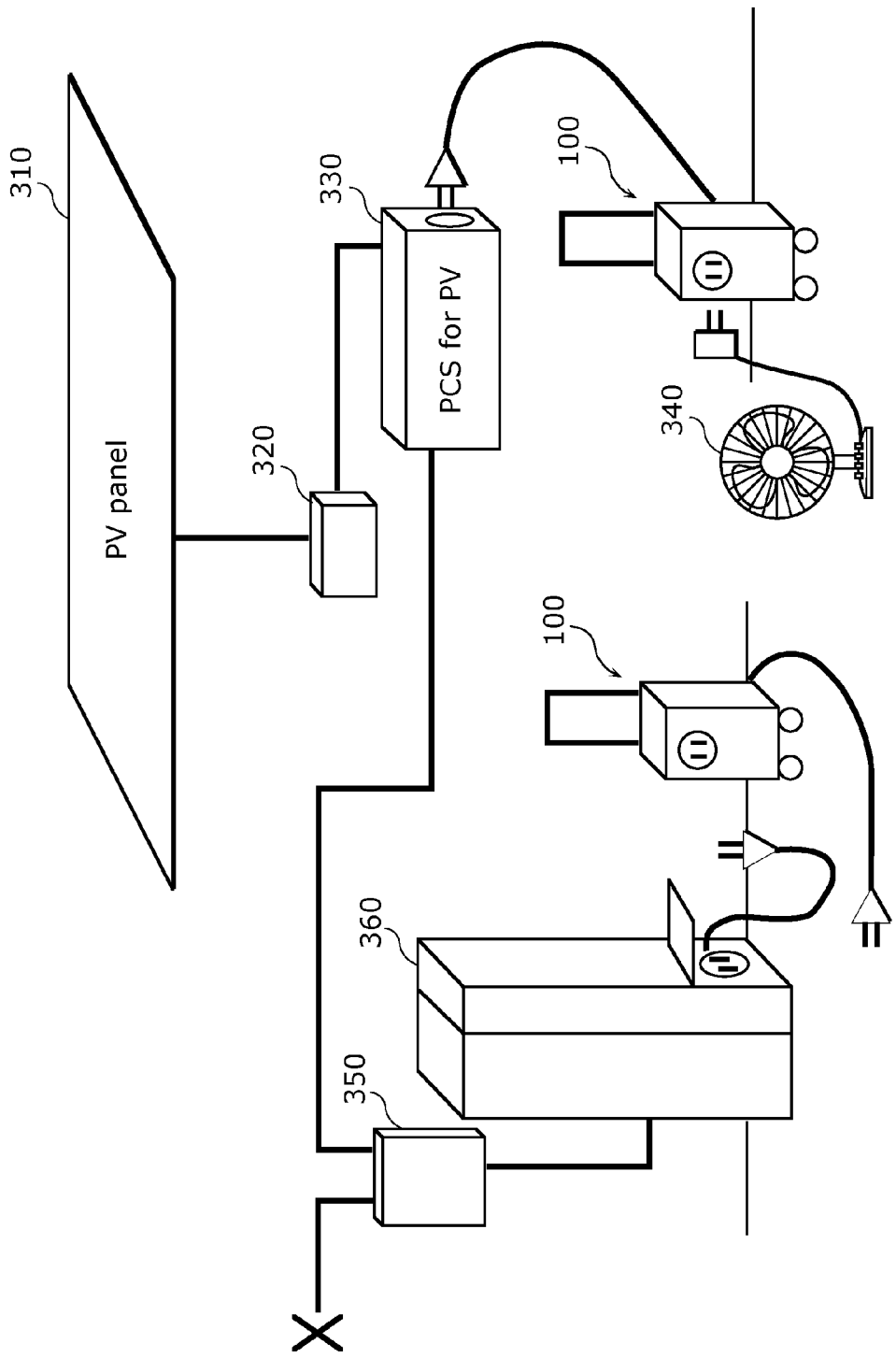
FIG. 1 illustrates an example of use of a portable power supply according to Embodiment 1.

A power supply apparatus according to an aspect of the present invention is a power supply apparatus which supplies power to an external apparatus by using a battery pack including a terminal unit which is electrically connectable to different types of a plurality of apparatuses, the power supply apparatus including: a connection unit to which the terminal unit of the battery pack is detachably connected; a power conversion unit which converts direct current power into first power, the direct current power being output from the terminal unit of the battery pack via the connection unit; a power plug for receiving power supplied from an external power source; a power supplying unit which supplies power to the external apparatus via a power receiving unit of the external apparatus through connection of the power receiving unit of the external apparatus to the power supplying unit; and a switching unit which switches between (i) outputting, to the power supplying unit, the first power output from the power conversion unit and (ii) outputting, to the power supplying unit, second power which is the power supplied from the external power source via the power plug.

This makes it possible to switch the power sources for supplying power to the power supplying unit. Thus, power can be supplied to an external apparatus by using the battery pack (battery) in an emergency (at the time of a power outage).

When the terminal unit of the battery pack is not connected to the connection unit, the switching unit may switch to output the second power to the power supplying unit.

With this, the power supply apparatus can operate automatically as a power supply regardless of the connection of the battery pack.

The power supply apparatus may further includes: an input reception unit which receives an input from a user; and a charge unit which charges the battery pack with the second power, in which when the input received by the input reception unit indicates a mode 1 and the terminal unit of the battery pack is connected to the connection unit, (i) the switching unit outputs the first power to the power supplying unit regardless of whether or not power is supplied from the external power source to the power supply apparatus, and (ii) the charge unit does not have to charge the battery pack with the second power even when power is supplied from the external power source to the power supply apparatus via the power plug.

When the input received by the input reception unit indicates a mode 2 and power is supplied from the external power source to the power supply apparatus via the power plug, the switching unit may output the second power to the power supplying unit even when the terminal unit of the battery pack is connected to the connection unit.

When the input received by the input reception unit indicates the mode 2 and power is not supplied from the external power source to the power supply apparatus via the power plug, the switching unit does not have to output the first power to the power supplying unit even when the terminal unit of the battery pack is connected to the connection unit.

When the input received by the input reception unit indicates a mode 3, the switching unit may (i) output the first power to the power supplying unit in a case where power is not supplied from the external power source to the power supply apparatus, and (ii) output the second power to the power supplying unit in a case where power is supplied from the external power source to the power supply apparatus even when the terminal unit of the battery pack is connected to the connection unit.

When the input received by the input reception unit indicates a mode 2 or the mode 3, the charge unit may charge the battery pack with the second power in a case where the terminal unit of the battery pack is connected to the connection unit and power is supplied from the external power source to the power supply apparatus via the power plug.

The battery pack may further include a charge amount indication unit which indicates a charge amount which is an amount of power charged in the battery pack, and the terminal unit of the battery pack may be connected to the connection unit such that the charge amount indication unit is viewable from outside the power supply apparatus.

With this, a user can visually check the charge amount of the battery pack. Moreover, using the charge amount indication unit of the battery pack as it is can simplify the configuration of the power supply apparatus.

The power supply apparatus may further includes a plurality of the connection units to each of which the terminal unit of the battery pack is connected; a detection unit which detects charge amounts of a plurality of the battery packs each of which includes the terminal unit connected to the connection unit; and a charge control unit which performs charging control by using at least power of one of the battery packs that contains a highest charge amount among the charge amounts detected by the detection unit to charge a different at least one of the battery packs.

The charge control unit may perform the charging control by using power of at least one of the battery packs that contains a charge amount more than an average amount of the charge amounts detected by the detection unit to charge a different at least one of the battery packs.

With this, the difference between the charge amounts of the battery packs can be reduced. Thus, duration for which outputting the high power that can be output using only a plurality of battery packs is possible can be extended.

The charge control unit may perform the charging control to equalize the charge amounts of the battery packs by using the power of the at least one of the battery packs that contains the charge amount more than the average amount of the charge amounts detected by the detection unit to charge a different at least one of the battery packs.

With this, duration for which outputting the high power is possible can be extended to the maximum.

The detection unit may further detect load current to be supplied to the external apparatus from the battery packs via the power supplying unit, and the charge control unit may perform the charging control when the load current is smaller than a maximum continuous current suppliable from the battery packs to the external apparatus.

With this, the difference between the charge amounts of the battery packs can be reduced while supplying power to the external electric apparatus. That is, the duration for which outputting the high power is possible can be extended while using the external electric apparatus.

The charge control unit may perform the charging control when a difference between the load current and the maximum continuous current is more than or equal to a predetermined value.

That is, the charge control unit checks surplus power by comparing the maximum continuous current of the battery packs and the load current. When there is a certain amount of surplus power, the charge control unit performs an equalizing process for reducing the difference between the charge amounts of the battery packs. In contrast, when there is not surplus power, the charge control unit does not perform the equalizing process.

With this, the difference between the charge amounts of the battery packs can be reduced while supplying power more stably to the external electric apparatus.

The power supply apparatus may further include a switching control unit which controls the switching unit based on an amount of the power to be supplied from the external power source or the charge amounts of the battery packs, and when the power charged in the battery packs is being output to the power supplying unit, the switching control unit may control the switching unit to output the second power to the power supplying unit in a case where the charge amounts of the battery packs are less than a predetermined value.

With this, the power supply apparatus can continue supplying power to the load even when the charge amounts of the battery packs are decreased.

The switch control unit may control the switching unit to output the second power to the power supplying unit when power supply from the external power source to the power supply apparatus is stopped and then resumed.

With this, the power supply apparatus can output power which is automatically supplied from the external power source to the power supplying unit when the power from the external power source to the power supply apparatus is stopped and then resumed.

The power supply apparatus may further includes: a display unit; a memory unit which stores information on an amount of power necessary for operating the external apparatus; a detection unit which detects a charge amount of the battery pack; and a display control unit which causes the display unit to display duration that power supply from the battery packs to the external apparatus is possible based on the charge amount of the battery pack and the amount of power necessary for operating the external apparatus.

With this, a user can know duration that power supply to the external electric apparatus is possible by checking the indication unit.

The apparatuses may include a power-assisted bicycle and an electric tool, and the external apparatus may be a refrigerator, an electric fan, a personal computer, or a television set.

That is, examples of the specific electric apparatus include a power-assisted bicycle and an electric tool, and the power supply apparatus supplies power to an external electric apparatus (household appliance or the like) by using a battery of a power-assisted bicycle or an electric tool. This enables manufacture of the power supply apparatus at costs lower than a stationary battery system or an electric vehicle (EV).

The power supply apparatus may further include: a time measurement unit which measures time, in which the switching unit may switch the outputting depending on the time measured by the time measurement unit.

With this, power sources for supplying power to the power supplying unit can be switched depending on time.

A battery pack according to an aspect of the present invention is a battery pack which is detachably connected to the power supply apparatus in any one of the above aspects, the battery pack comprising: one or more batteries; and a terminal unit which is electrically connectable to an apparatus which is different from the power supply apparatus, in which discharge power from the one or more batteries is supplied via the terminal unit to the apparatus connected to the battery pack via the terminal unit.

These general or generic aspects may be implemented using a system, a method, an integrated circuit, a computer program, or a computer-readable recording medium such as a CD-ROM, or any combination of systems, methods, integrated circuits, computer programs, and computer-readable recording media.

Hereinafter, embodiments are described in detail with reference to the drawings. In embodiments, a portable power supply is described as one example of the power supply apparatus.

Each of the embodiments described below shows a general or specific example. The numerical values, shapes, materials, structural elements, the arrangement and connection of the structural elements, steps, the processing order of the steps etc. shown in the following embodiments are mere examples. Therefore, each of the embodiments does not limit the scope of the present invention. Among the structural elements in the following exemplary embodiments, structural elements not recited in any one of the independent claims indicating the most generic concept of the present invention are described as optional structural elements.

Embodiment 1

1. Summary

A portable power supply according to Embodiment 1 is a power supply which uses power from a battery pack that is for a specific electric apparatus and which can be easily carried around by a user. The portable power supply according to Embodiment 1 is useful especially when a power outage occurs due to disasters and the like.

The portable power supply according to Embodiment 1 can use a battery pack for a power-assisted bicycle and be used as a power supply for different types of electric apparatuses (external electric apparatuses) other than the power-assisted bicycle. In other words, the power of the battery pack for a power-assisted bicycle can be efficiently used in an emergency.

Furthermore, the portable power supply according to Embodiment 1 can also be used as illustrated in FIG. 1.

FIG. 1 illustrates an example of use of the portable power supply according to Embodiment 1.

A fuel cell system 360 usually needs to be supplied with external power for start up to start power generation. In general, the fuel cell system 360 starts up with the power supplied from a power system via a distribution switchboard 350. Therefore, when the power supply from the power system is stopped, for example, in a power outage due to disaster, the fuel cell system 360 cannot be started. In such a case, the fuel cell system 360 can be started by using a portable power supply 100.

Moreover, as illustrated in FIG. 1, if the fuel cell system 360 is started with the power from a photovoltaic power system, the fuel cell system cannot be easily started during nighttime when the power generation of the photovoltaic power system is extremely low. Also in such a case, a user can start the fuel cell system 360 by using the portable power supply 100.

Moreover, use of the portable power supply 100 allows the power generated by a photovoltaic power system in a certain residence to be used to drive an electric apparatus in another residence at the time of disaster.

As illustrated in FIG. 1, the power generated by a photovoltaic (PV) panel 310 is usually output from a power conditioning system 330 via a connection box 320. Here, first, a user charges the battery pack held in the portable power supply 100 by using the power supplied from the power conditioning system 330 in the PV panel power generation system in a certain residence. The user then brings the portable power supply 100 in another residence, and accordingly the user can use the power from the portable power supply 100 to drive home electric appliances (e.g., an electric fan 340 and the like).

As described above, use of the portable power supply 100 enables the user to flexibly use and share power in an emergency.

2. Configuration

First, a configuration of the portable power supply 100 is described with reference to FIG. 2.

Figure 2:
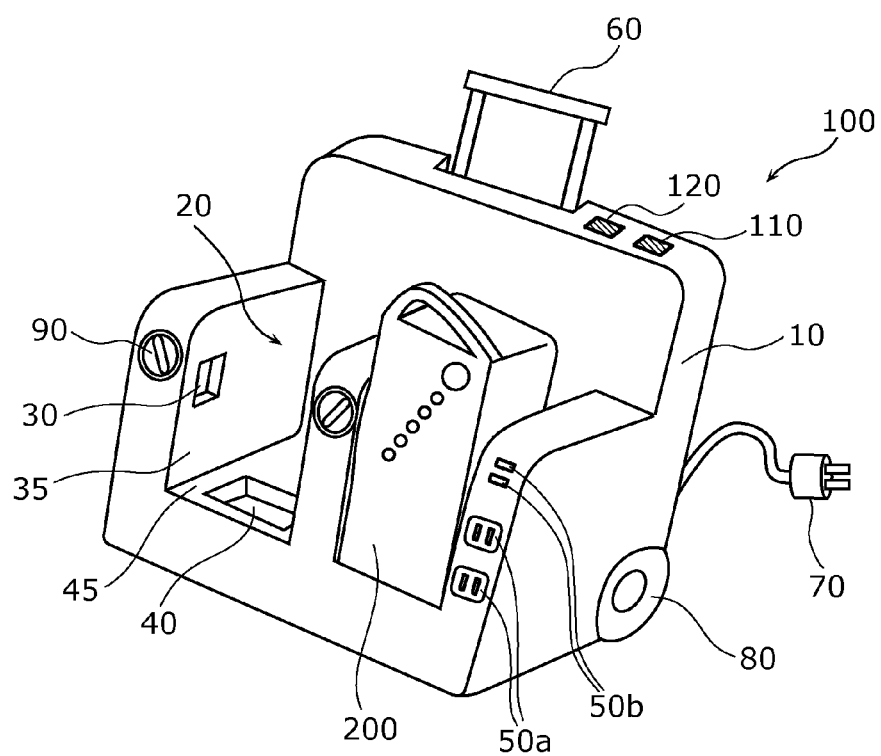
FIG. 2 illustrates an external view of the portable power supply according to Embodiment 1.

FIG. 2 is an external view of the portable power supply 100.

The portable power supply 100 includes: a case 10, a holding unit 20, a fitting unit 30, a connection unit 40, an outlet 50a and a USB socket 50b (a power supplying unit), and a discharge unit (not illustrated). Furthermore, the portable power supply 100 includes: a handle unit 60, a power plug 70, a caster 80, a fixing unit 90, a switch 110, and a reception unit 120.

The case 10 includes a charge/discharge control circuit for charging or discharging a battery pack 200 which includes the discharge unit therein. The case 10 is provided with the holding unit 20 for storing and holding the battery pack 200.

The holding unit 20 holds the battery pack 200. The holding unit 20 is provided to the case 10 in accordance with the shape of the battery pack 200. In Embodiment 1, two holding units 20 are provided to the case 10 to hold two battery packs 200. Although the present embodiment is described in the case of using two holding units 20 as an example, the number of the holding unit 20 may be one or more than two.

Each of the holding units 20 is provided with the fitting unit 30. The fitting unit 30 is provided to a side unit 35 of each of the holding units 20 at a position and in a size that fit an attachment unit which will be described later. The attachment unit provided to the battery pack 200 fits the fitting unit 30.

The fitting unit 30 and the attachment unit are fixed by the fixing unit 90.

Note that examples of the shape of the fitting unit 30 include, but are not limited to, a recessed shape as illustrated in FIG. 2. The shape of the fitting unit 30 may be any shape, provided that the fitting unit 30 fits with the attachment unit which is provided on the battery pack 200.

Each of the holding units 20 is provided with the connection unit 40. The connection unit 40 is provided to a base unit 45 of each of the holding units 20 at a position and in a size that fit a terminal unit which will be described later. The terminal unit provided on the battery pack 200 is detachably connected to the connection unit 40. As shown in FIG. 2, the shape of the connection unit 40 is, for example, a recessed shape to hold the terminal unit provided on the battery pack 200. Connection between the connection unit 40 and the terminal unit provides electrical connection between each terminal provided in the terminal unit and the charge/discharge control circuit in the case 10. In other words, connection between the connection unit 40 and the terminal unit provides electrical connection between the battery pack 200 and the portable power supply 100.

The battery pack 200 is held in the holding unit 20 such that a charge amount indication unit which will be described later is viewable from outside the portable power supply 100. In other words, the terminal unit of the battery pack 200 is connected to the connection unit 40 such that the charge amount indication unit is viewable from outside the portable power supply 100. This enables a user to visually check the charge amount of the battery pack 200. The charge amount of the battery pack 200 can be presented to the user by using an existing charge amount indication unit of the battery pack 200. Thus, providing another charge amount indication unit to the case 10 of the portable power supply 100 is not necessary. This simplifies the structure of the body of the portable power supply 100.

The side unit 35 is provided by being opposed with a second side surface of the body of the battery pack 200 held in the holding unit 20. The second side surface is a surface having the attachment unit among the surfaces of the body of the battery pack 200.

The base unit 45 is provided by being opposed with a bottom surface of the body of the battery pack 200 held in the holding unit 20. The bottom surface is a surface having the terminal unit among the surfaces of the body of the battery pack 200.

The outlet 50a is an outlet for providing alternating current power to an electric apparatus which includes a plug connected to the outlet 50a. That is, an alternating current (AC) plug (power receiving unit) of an external apparatus is connected to the outlet 50a.

The USB socket 50b is a socket for providing direct current power to a USB apparatus connected to the USB socket 50b. That is, a USB socket (power receiving unit) of an external apparatus is connected to the USB socket 50b.

The handle unit 60 is a handle to be held by a user to carry the portable power supply 100. The handle unit 60 can be stored in the case 10, and is extracted from the case 10 by the user.

The power plug 70 is connected to an external power source to receive power from the external power source. The external power source is a power source such as a commercial system, or a self-generating power supply such as a PV panel system or a fuel cell system.

The caster 80 is a wheel provided on the bottom surface side of the case 10. Two casters 80 are provided on the case 10, and the casters 80 rotate against the case 10 when a user holds the handle unit 60 and pushes the portable power supply 100. This enables the user to easily move the portable power supply 100.

The fixing unit 90 fixes the attachment unit of the battery pack 200 to the fitting unit 30 with the attachment unit being fit into the fitting unit 30. The fixing unit 90 is provided on the case 10 corresponding to the fitting unit 30. That is, two fixing units are provided on the case 10 in Embodiment 1. In Embodiment 1, the fixing unit 90 is a turn-style fixing unit, and turning the fixing unit 90 in a clockwise direction by a user fixes the attachment unit to the fitting unit with the attachment unit being fit into the fitting unit 30. Tuning the fixing unit 90 in a counterclockwise direction by the user releases the attachment unit from the fitting unit 30.

The switch 110 is a hardware switch for switching between supplying and not supplying the power from the battery pack 200 to the discharge unit. The discharge unit will be described later in detail, and one example of the discharge unit is an inverter. When a user does not use the portable power supply 100, the power supply to the inverter can be stopped with the switch 110. This makes it possible to reduce use of the power charged in the battery pack 200.

The reception unit 120 is a hardware switch for receiving a request for control of charging from a user. For example, when the user wishes to perform charging control (equalizing process) which will be described later, the user presses the hardware switch, i.e., the reception unit 120. The reception unit 120 may be a light reception unit of a remote controller or the like. In such a case, the reception unit 120 receives an operation input from the user via the remote controller. Note that the charging control will be described later in detail.

Note that, the side unit 35, the handle unit 60, the caster 80, the fixing unit 90, the switch 110, and the reception unit 120 are optional structural elements. The portable power supply 100 does not have to include the side unit 35, the handle unit 60, the fixing unit 90, the switch 110, and the reception unit 120.

Next, the battery pack 200 will be described in detail with reference to FIG. 3.

Figure 3:
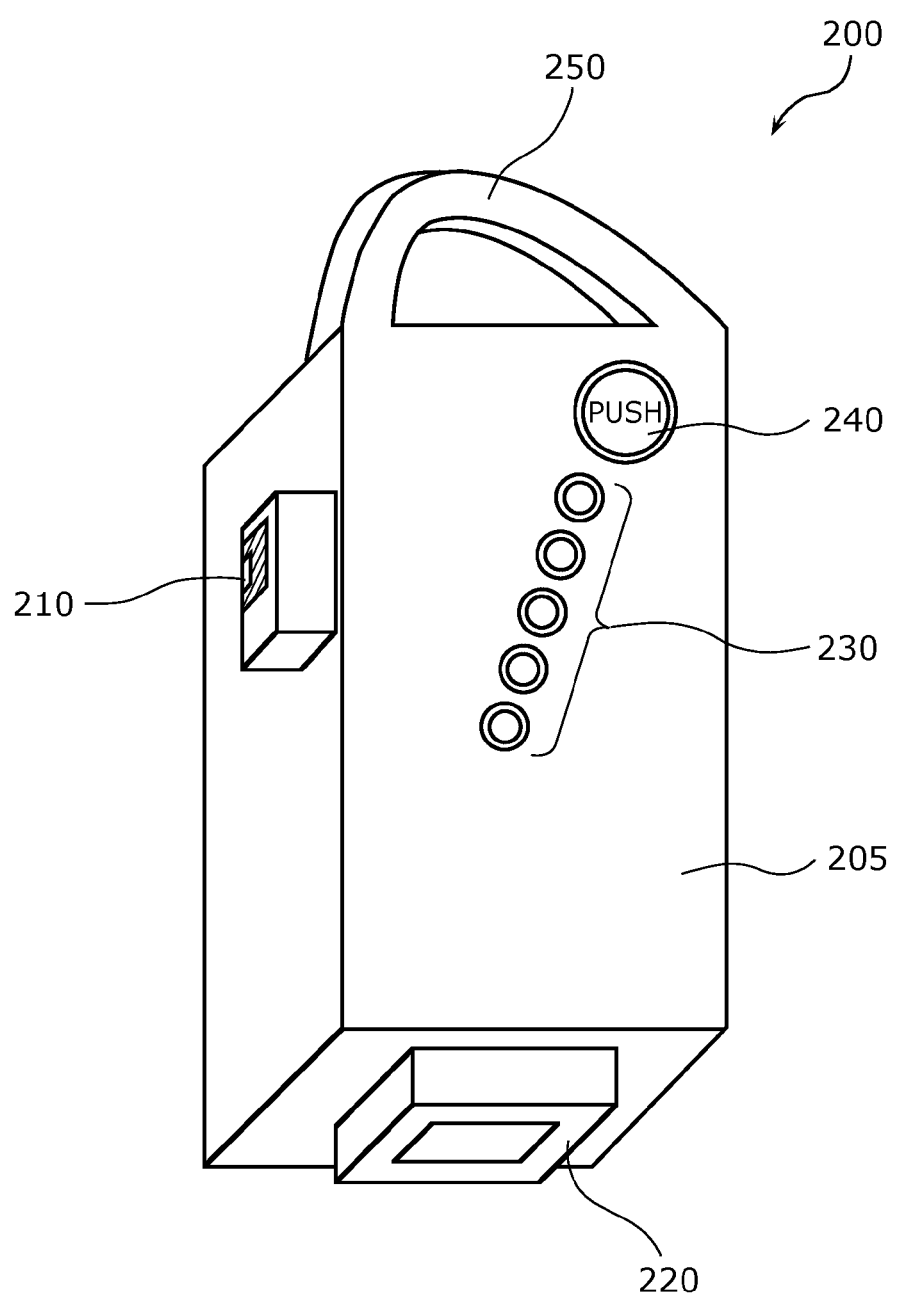
FIG. 3 is an external view of a battery pack.

FIG. 3 illustrates an example of an external view of the battery pack 200. In Embodiment 1, the battery pack 200 is described as a battery pack used for a power-assisted bicycle, but the battery pack 200 is not limited to a standardized battery pack which is used for a specific apparatus such as a power-assisted bicycle. For example, the battery pack 200 may support different types of apparatuses (be compatible with different types of apparatuses), and include a terminal unit to be electrically connected to the apparatuses.

As illustrated in FIG. 3, the battery pack 200 includes: a body 205, an attachment unit 210, a terminal unit 220, a charge amount indication unit 230, a charge amount indication button 240, and a handle 250. The battery pack 200 includes one or more batteries therein, although they are not shown in the diagram.

The batteries are secondary batteries which are capable of repeated charging and discharging. The batteries output direct current power in discharging. One example of the batteries is lithium ion batteries.

The body 205 may be, for instance, a rectangular parallelepiped shape, and the body 205 includes therein one or more batteries and an internal circuit which will be described later. Note that the rectangular parallelepiped shape does not need to be a complete rectangular parallelepiped shape. For example, each of the side surfaces may have rounded corners. The body 205 may also be formed to be elliptical by assembling side surfaces, all or some of which are elliptical.

The attachment unit 210 is a projected portion provided on a side surface of the body 205 so that the attachment unit 210 fits into a power-assisted bicycle. When the terminal unit 220 is connected to the connection unit 40 of the portable power supply 100, the attachment unit 210 fits into the fitting unit 30. That is, the fitting unit 30 is provided on the side unit 35 of the case 10 at a position and in a size that fit the attachment unit 210, and the connection unit 40 is provided on the base unit 45 of the case 10 at a position and in a size that fit the terminal unit 220.

The terminal unit 220 is detachably attached to a power-assisted bicycle to provide power to the power-assisted bicycle. The terminal unit 220 is provided on the bottom surface of the body 205. The terminal unit 220 includes terminals therein for charging or discharging the batteries. These terminals are electrically connected to the internal circuit of the power-assisted bicycle through connection of the terminal unit 220 to the power-assisted bicycle.

Moreover, the terminal unit 220 is connected to the connection unit 40 of the portable power supply 100. In such a case, connection of the terminal unit 220 to the connection unit 40 provides connection between the terminals provided in the terminal unit 220 and the charge/discharge control circuit in the portable power supply 100.

The charge amount indication unit 230 displays the amount of power charged in the batteries of the battery pack 200. In Embodiment 1, the charge amount indication unit 230 includes five light emitting diodes (LED). When a user presses the charge amount indication button 240, the charge amount indication unit 230 lights one or more LEDs. The number of the LEDs to be lighted corresponds to the charge amount. The charge amount indication unit 230 is provided on a first side surface of the body 205.

The charge amount indication button 240 is a button to be pressed by a user to show the charge amount on the charge amount indication unit 230. The charge amount indication button 240 is provided on a side surface of the body 205.

The handle 250 is a handle to be held by a user to carry the battery pack 200. The handle 250 is provided on a surface which opposes the bottom surface of the body 205.

Note that, although not shown in FIG. 3, the battery pack 200 may include a USB port, and output power to an external apparatus via the USB port.

The following describes the charge/discharge control circuit provided inside the case 10.

Figure 4:
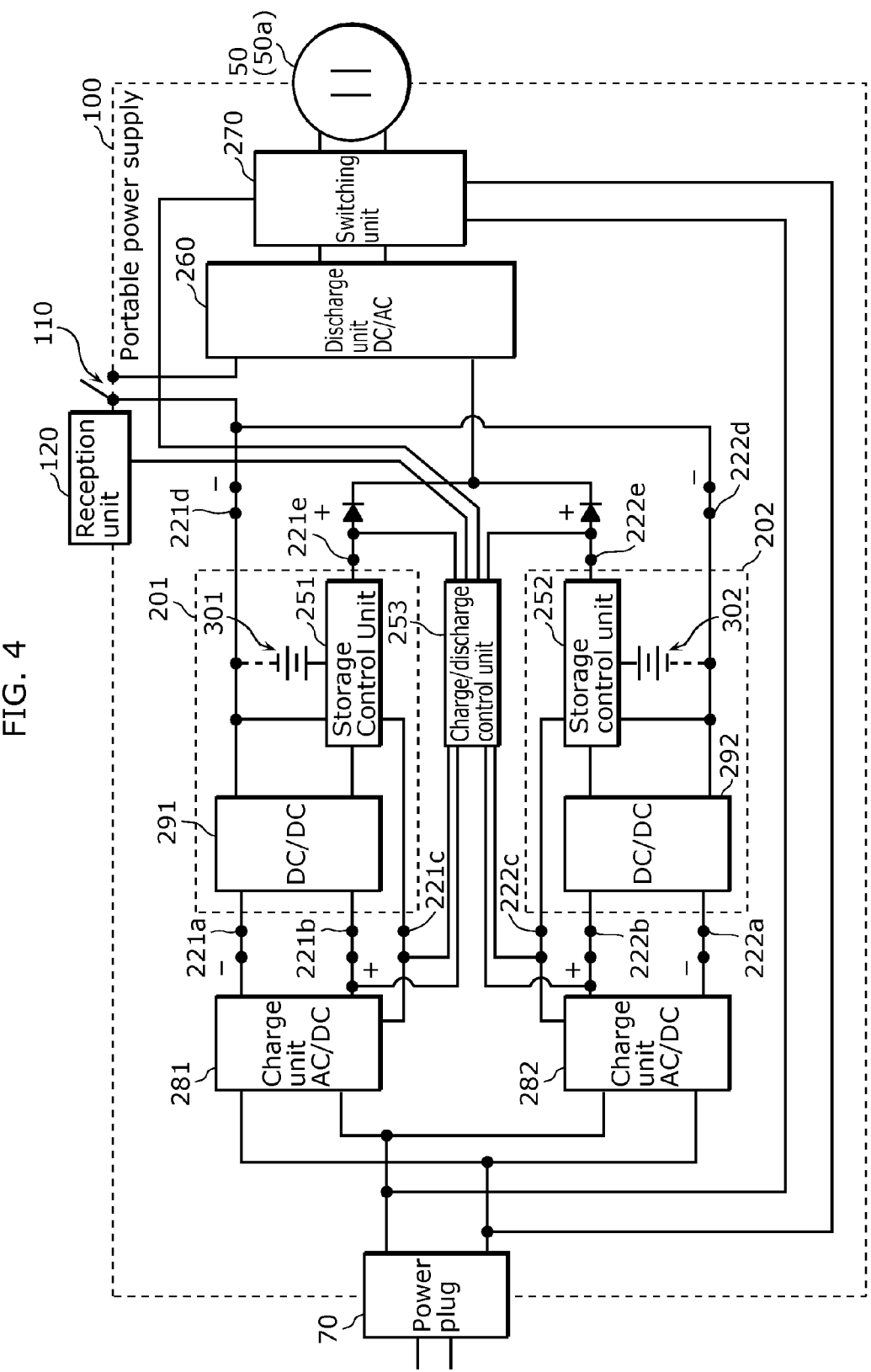
FIG. 4 is a circuit block diagram illustrating a charge/discharge control circuit in the portable power supply.

FIG. 4 is a circuit block diagram illustrating the charge/discharge control circuit in the portable power supply 100. Note that the battery packs 201 and 202 are two battery packs each connected to one of the two connection units 40 of the portable power supply in FIG. 2, and are the same as the battery pack 200 described with reference to FIG. 3.

As illustrated in FIG. 4, the charge/discharge control circuit in the portable power supply 100 includes: a discharge unit 260 (a power conversion unit), a charge unit 281, a charge unit 282, a charge/discharge control unit 253 (a detection unit and a switching control unit), and a switching unit 270.

The internal circuit of the battery pack 201 includes: a DC/DC converter 291, a storage control unit 251, and batteries 301. The internal circuit of the battery pack 202 includes: a DC/DC converter 292, a storage control unit 252, and batteries 302.

The charge/discharge control circuit illustrated in FIG. 4 allows the portable power supply 100 to operate the following operations (1) to (7) when the battery packs 201 and 202 are connected to the portable power supply 100.

(1) The portable power supply 100 outputs (passes) the power supplied from an external power source via the power plug 70 to the power supplying unit 50, while charging the battery packs 201 and 202 with the power supplied from the external power source via the power plug 70.

(2) The portable power supply 100 outputs the power supplied from the external power source via the power plug 70 to the power supplying unit 50, but does not charge the battery packs 201 and 202.

(3) The portable power supply 100 outputs the power supplied from the external power source via the power plug 70 to the power supplying unit 50, while equalizing the charge amounts of the battery packs.

(4) The portable power supply 100 outputs the power charged in the battery packs 201 and 202 to the power supplying unit 50 when power is supplied from the external power source via the power plug 70 (peak shift function).

(5) The portable power supply 100 outputs the power charged in the battery packs 201 and 202 to the power supplying unit 50 when the portable power supply 100 cannot receive power from the external power source via the power plug 70 due to a power outage or the like, or when the power plug 70 is not plugged in an outlet.

(6) The portable power supply 100 charges the battery packs 201 and 202 with the power supplied from the external power source via the power plug 70, while outputting the power charged in the battery packs 201 and 202 to the power supplying unit 50.

(7) The portable power supply 100 outputs the power charged in the battery packs 201 and 202 without charging the battery packs with the power supplied from the external power source via the power plug 70.

Moreover, the portable power supply 100 can output (pass) the power supplied from the external power source via the power plug 70 to the power supplying unit 50, when the battery packs 201 and 202 are not connected to the portable power supply 100.

The following is a detailed description of the charge/discharge control circuit in the portable power supply 100.

The discharge unit 260 outputs, to the power supplying unit 50 (outlets 50a or USB sockets 50b), the power charged in the battery packs 201 and 202 which are connected to the connection unit 40.

Figure 5:
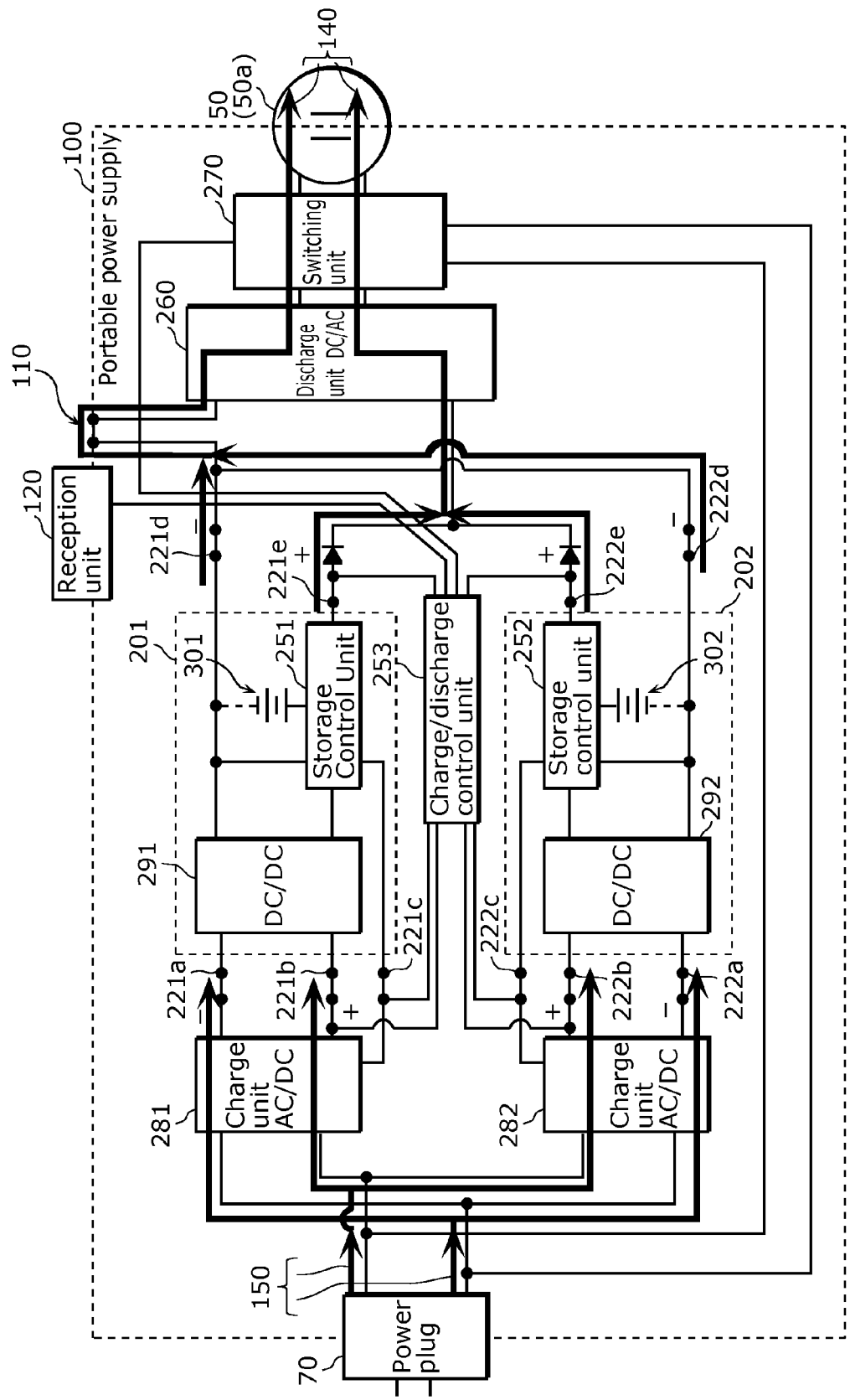
FIG. 5 illustrates routes for supplying power in the charge/discharge control circuit.

FIG. 5 illustrates routes for supplying power in the charge/discharge control circuit.

Assuming that the power supplying unit 50 is the outlets 50a, the discharge unit 260 is a DC/AC inverter which outputs alternating current power by converting the direct current power output from the battery packs 201 and 202 into alternating current power, as indicated by routes 140 (right arrows) in FIG. 5. Assuming that the power supplying unit 50 is the USB sockets 50b, the discharge unit 260 is a DC/DC converter which outputs 5 V direct current power usable for USB apparatuses by converting the direct current power output from the battery packs 201 and 202 into 5 V direct current power. As illustrated in FIG. 2, when the portable power supply 100 has both of the outlets 50a and the USB sockets 50b, the portable power supply 100 includes the DC/AC inverter corresponding to the outlets 50a, and the DC/DC converter corresponding to the USB sockets 50b.

The discharge unit 260 is electrically connected to the internal circuit of the battery pack 201 via terminals 221d and 221e which are used for outputting (discharging) power and provided in the terminal unit 220 of the battery pack

201. Note that the terminal 221e is electrically connected to the discharge unit 260 via a diode for rectification.

Likewise, the discharge unit 260 is electrically connected to the internal circuit of the battery pack 202 via terminals 222d and 222e which are used for outputting power and provided in the terminal unit 220 of the battery pack 202. Note that the terminal 222e is electrically connected to the discharge unit 260 via a diode for rectification.

As described above, a user can choose whether or not to supply power to the discharge unit 260 from the battery packs 201 and 202 by switching the switch 110.

The charge unit 281 charges the battery pack 201 with the power supplied from the external power source via the power plug 70. Likewise, the charge unit 282 charges the battery pack 202 with the power supplied from the external power source via the power plug 70.

As indicated by routes 150 (left arrows) in FIG. 5, the charge unit 281 is an AC/DC converter which charges the battery pack 201 by converting the alternating current power supplied from the power plug 70 into direct current power, and outputting the direct current power to the battery pack 201. The charge unit 281 is electrically connected to the internal circuit of the battery pack 201 via the terminals 221a and 221b which are used for charging and provided in the terminal unit 220 of the battery pack 201.

Note that the charge unit 281 and the battery pack 201 are electrically connected to each other also via the terminal 221c provided in the terminal unit 220. The terminal 221c is a terminal dedicated to notify the amount of power (charge amount) charged in the battery pack 201.

Likewise, the charge unit 282 is an AC/DC converter which charges the battery pack 202 by converting the alternating current power supplied from the power plug 70 into direct current power and outputting the direct current power to the battery pack 202. The charge unit 282 is electrically connected to the internal circuit of the battery pack 202 via the terminals 222a and 222b which are used for charging and provided in the terminal unit 220 of the battery pack 202.

Note that the charge unit 282 and the battery pack 202 are electrically connected to each other also via the terminal 222c provided in the terminal unit 220. The terminal 222c is a terminal dedicated to notify the charge amount of the battery pack 202.

The charge/discharge control unit 253 detects a charge amount of each of the battery packs 201 and 202. Specifically, the charge/discharge control unit 253 detects the charge amount of each of the battery packs 201 and 202 based on signals output from the battery packs 201 and 202 via the respective terminals 221c and 222c.

Furthermore, the charge/discharge control unit 253 performs charging control by using the power of the battery pack containing a highest charge amount among the battery packs to charge a different at least one of the battery packs.

Figure 6:
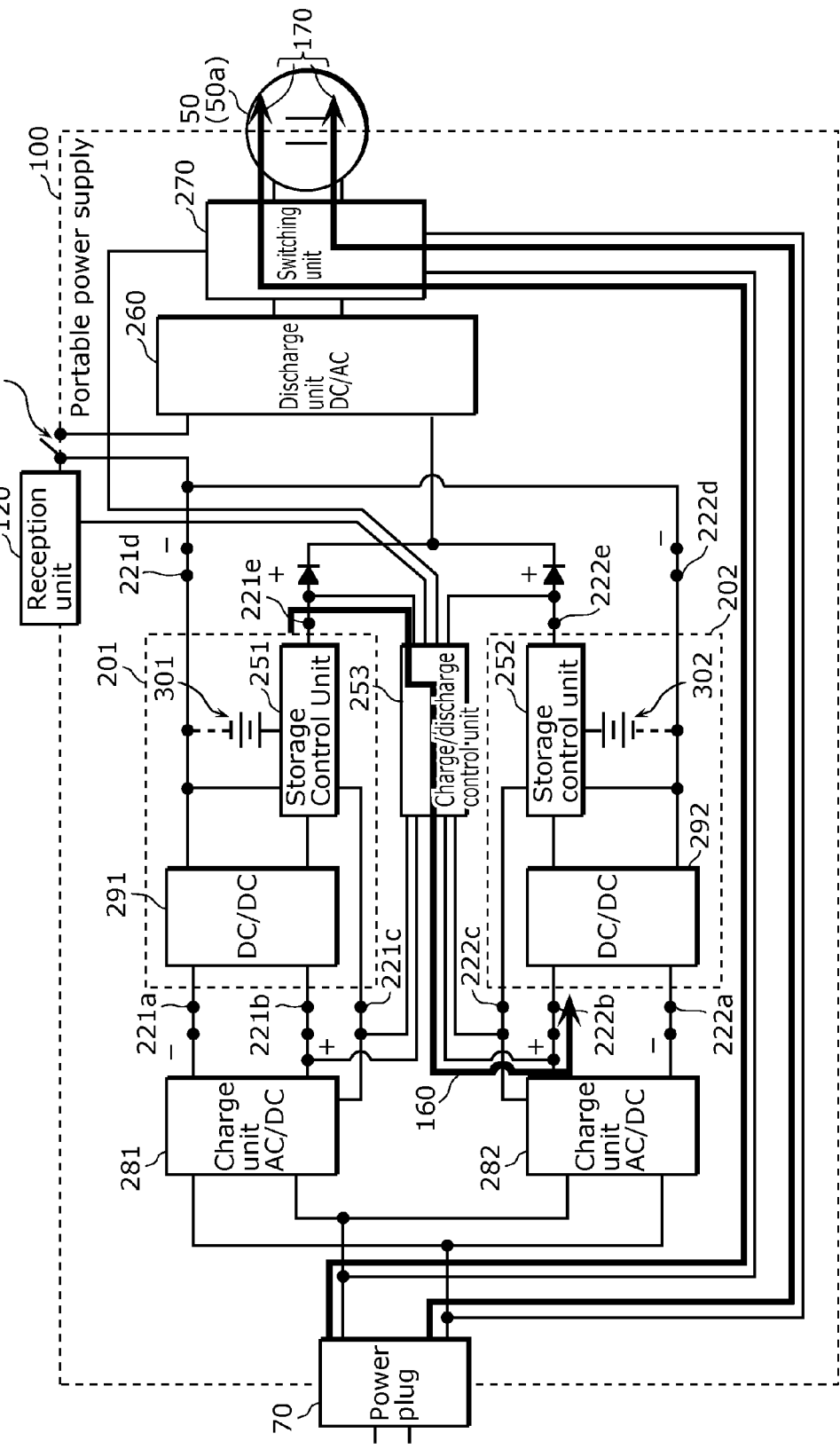
FIG. 6 is another diagram illustrating routes for supplying power in the charge/discharge control circuit.

FIG. 6 is another diagram illustrating routes for supplying power in the charge/discharge control circuit.

When the charge amount of the battery pack 201 is higher than that of the battery pack 202, the battery pack 202 is charged by using the power of the battery pack 201. Specifically, as illustrated by a route 160 (the arrow going through the charge/discharge control unit 253) in FIG. 6, the charge/discharge control unit 253 charges the battery pack 202 by using the power of the battery pack 201 via the route 160 indicating the electrical connection between the terminals 221e and 222b.

Likewise, when the charge amount of the battery pack 202 is higher than that of the battery pack 201, the charge/discharge control unit 253 charges the battery pack 201 by using the power of the battery pack 202 via the route 160 indicating the electrical connection between the terminals 222e and 222b.

The charge/discharge control unit 253 controls the switching unit 270 based on the amount of power supplied from the external power source via the power plug 70, or the charge amounts of the battery packs. Switching control by the charge/discharge control unit 253 will be described later in detail.

The charge/discharge control unit 253 equalizes the charge amounts of the battery packs when the reception unit 120 receives a request for control of charging from a user. The equalizing process will be described later in detail.

Note that the charge/discharge control unit 253 detects (measures) load current of a load (external electric apparatus) connected to the power supplying unit 50 by using a circuit which is used for measuring current and provided in the switching unit 270.

The switching unit 270 switches, based on a control signal output from the charge/discharge control unit 253, between (i) outputting the power supplied from the external power source via the power plug 70 to the power supplying unit 50, and (ii) outputting the power charged in the battery packs 201 and 202 to the power supplying unit 50.

When the switching unit 270 switches to (i) output the power supplied from the external power source via the power plug 70 to the power supplying unit 50, the power is output to the power supplying unit 50 via the routes 170 (the arrows going through the switching unit 270) in FIG. 6. When the switching unit 270 switches to (ii) output the power charged in the battery packs 201 and 202 to the power supplying unit 50, the power is output to the power supplying unit 50 via the routes 140 in FIG. 5.

Note that, in the embodiments, the power converted by the discharge unit 260 and charged in the battery pack is also referred to hereinafter as first power, and the power supplied from the external power source via (through) the power plug 70 is also referred to hereinafter as second power. In short, the switching unit 270 switches between (i) outputting the first power to the power supplying unit 50 and (ii) outputting the second power to the power supplying unit 50.

Furthermore, the switching unit 270 outputs the second power to the portable power supply 50 when the battery packs 201 and 202 are not connected to the connection units 40 of the portable power supply 100. Specifically, the switching unit 270 can detect whether the battery packs 201 and 202 are connected to the connection units 40 by providing a mechanism or the like for detecting the connection of the battery packs 201 and 202.

Such a configuration enables the switching unit 270 to automatically output the second power to the power supplying unit 50 when the battery packs 201 and 202 are not connected to the connection units 40. Thus, a user can use the portable power supply 100 automatically as a power supply regardless of connection of the battery packs 201 and 202.

Next, descriptions will be given of the internal circuit of the battery pack 201. Note that descriptions of the internal circuit of the battery pack 202 are omitted because the internal circuit of the battery pack 202 is similar to that of the battery pack 201.

The DC/DC converter 291 converts the direct current power output from the charge unit 281 into power usable to charge the batteries 301.

The storage control unit 251 charges the batteries 301 by controlling the DC/DC converter 291. Moreover, the storage control unit 251 detects charge amounts of the batteries 301, and output signals to notify the terminal 221c of the charge amounts of the batteries 301. The storage control unit 251 outputs (discharges) the power charged in the batteries 301 to the terminal 221e by using the terminal 221d as a reference potential.

The batteries 301 are secondary batteries which are capable of repeated charging and discharging as mentioned above.

Note that, as described above, the terminal unit 220 of the battery pack 201 (battery pack 202) is provided with the terminals 221a and 221b (terminals 222a and 222b) for charging, and the terminals 221d and 221e (terminals 222d and 222e) for discharging. The terminals for charging and the terminals for discharging are provided independently from each other. That is, the battery pack 201 (battery pack 202) has the terminal unit 220 which supports a specific electric apparatus (a power-assisted bicycle in Embodiment 1) to supply the charged power to the specific electric apparatus.

The connection unit 40 of the portable power supply 100 is provided with a terminal corresponding to each of the terminals for charging the battery pack 201 (battery pack 202), and a terminal corresponding to each of the terminals for discharging. That is, the portable power supply 100 is made such that a battery pack for a specific electric apparatus fits the portable power supply 100. This is a point different from power supplies which use commercially-available batteries (e.g., dry-cell batteries).

3. Operation

Next, operations of the portable power supply 100 will be described.

[3-1. Equalizing Process]

First, description is given of an equalizing process for equalizing charge amounts between battery packs on the portable power supply 100.

Figure 7:
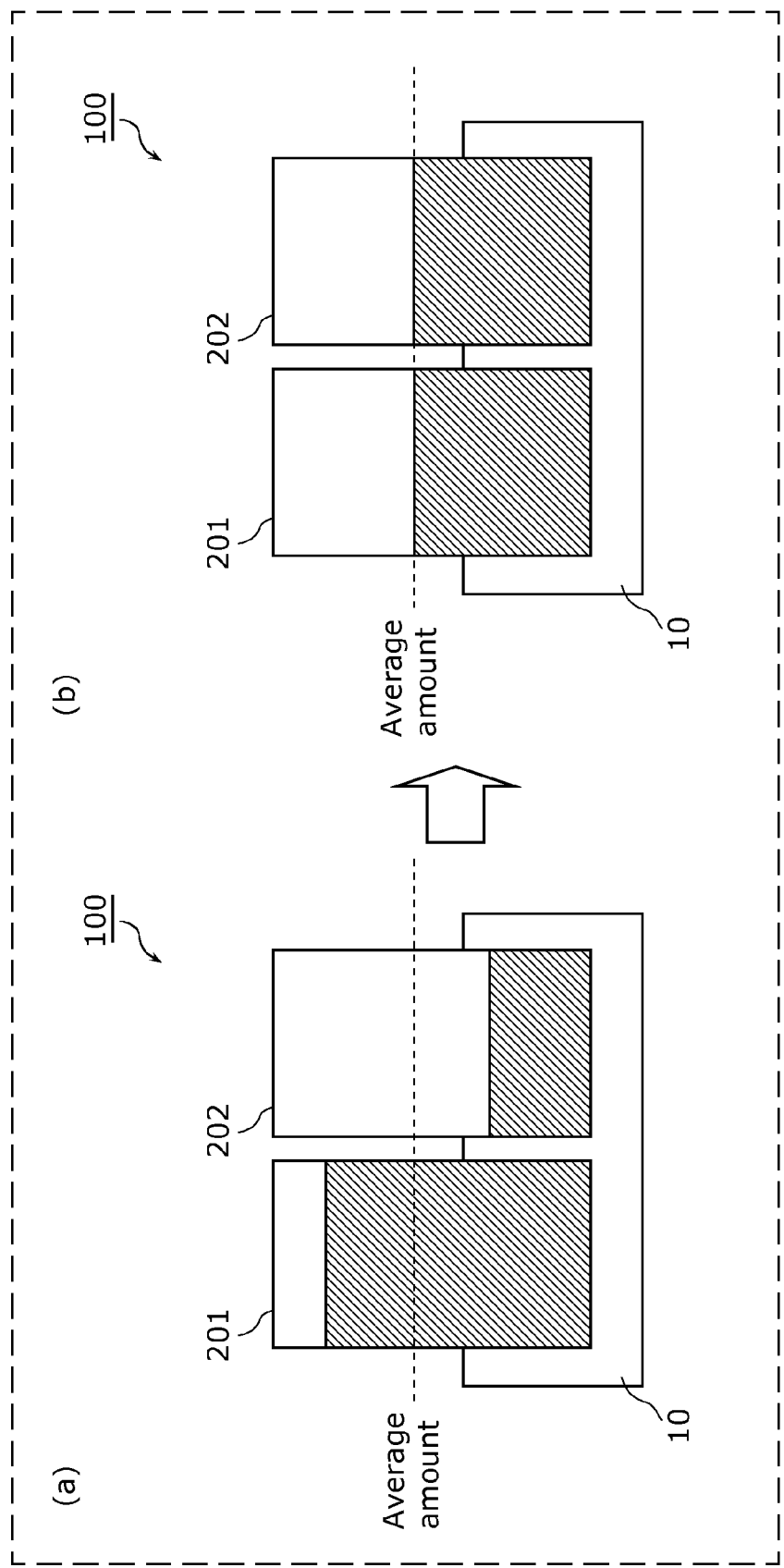
FIG. 7 is a schematic diagram illustrating an equalizing process.

FIG. 7 is a schematic diagram illustrating the equalizing process.

As illustrated in (a) in FIG. 7, two battery packs 201 and 202 are connected to the case 10, and it is assumed that the charge amount of the battery pack 201 is higher than that of the battery pack 202.

In this case, as illustrated in (b) in FIG. 7, the charge/discharge control unit 253 performs the equalizing process which is a charging control to charge the battery pack 202 with the power of the battery pack 201 having a higher charge amount to equalize the charge amounts of the battery packs.

Figure 8:
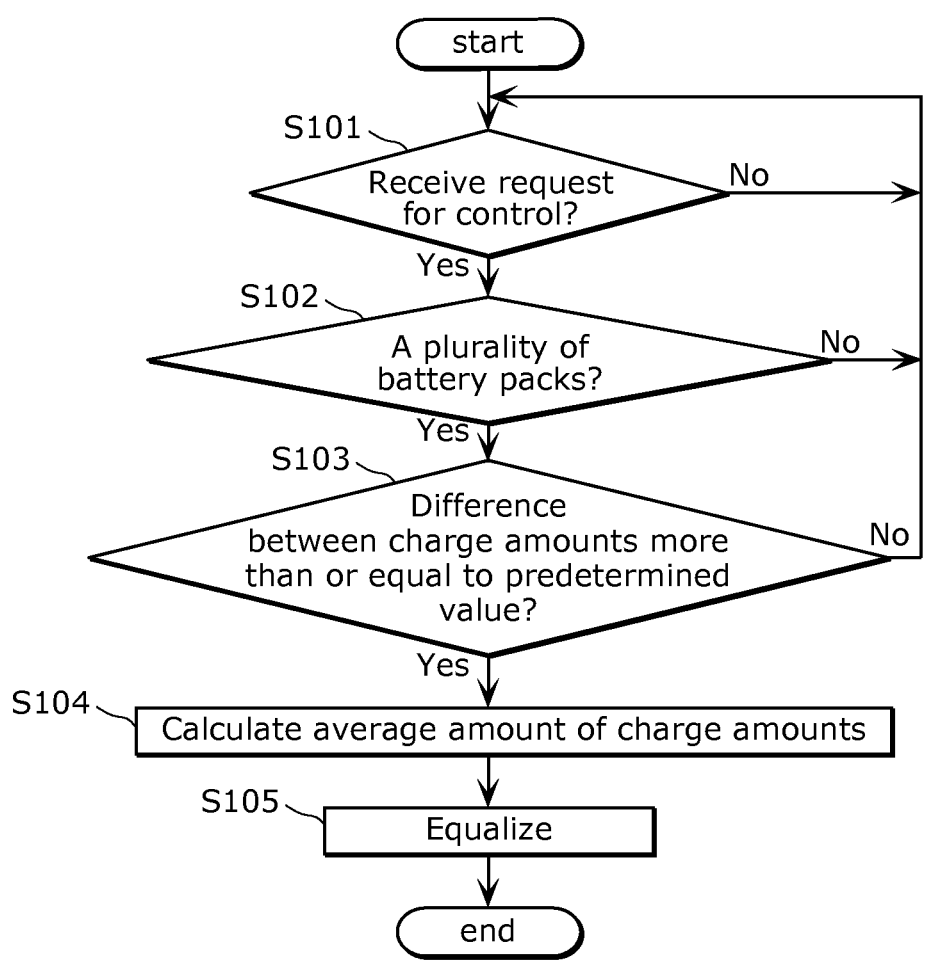
FIG. 8 is a flowchart illustrating the equalizing process performed on the portable power supply.

FIG. 8 is a flowchart illustrating the equalizing process performed on the portable power supply 100.

First, the reception unit 120 receives a request for control of equalizing process from a user (S101).

When the reception unit 120 receives the request for control (Yes in S101), the charge/discharge control unit 253 determines whether a single or a plurality of battery packs are connected to the connection units 40 (S102). The charge/discharge control unit 253 can determine a plurality of battery packs are connected to the connection units 40, for example, by monitoring voltage values of the terminals 221c and 222c in the charge/discharge control circuit illustrated in FIG. 4.

When the reception unit 120 does not receive a request for control (No in S101), the charge/discharge control unit 253 continues to monitor detection of a request for control input to the reception unit 120.

When a plurality of battery packs are connected to the connection units 40 (Yes in S102), the charge/discharge control unit 253 obtains a charge amount for each of the battery packs (S103). When difference between the charge amounts of the battery packs is more than or equal to a predetermined value (Yes in S103), the charge/discharge control unit 253 calculates an average amount of the charge amounts (S104). The predetermined value mentioned above is a threshold value for starting the equalizing process and the threshold value is determined in designing. Note that the step S103 may be omitted.

As described above, determination of a threshold value for starting the equalizing process makes it possible not to perform the equalizing process when there is a small difference between the charge amounts of the batteries and the equalizing process would not be so effective. That is, the equalizing process is performed effectively.

To equalize the charge amounts of the battery packs, the charge/discharge control unit 253 uses power of at least one of battery packs having a charge amount higher than the average amount of the charged amounts of the battery packs to charge a different at least one of the battery packs (S105).

This process reduces the difference between the charge amounts of the battery packs connected to the portable power supply 100, and extends duration for which outputting the high power that can be output using a plurality of the battery packs is possible, compared to the case without reducing the difference between the charge amounts.

Specifically, for example, assuming that the output of a single battery pack is approximately 500 W, 1000 W power output is possible by connecting two battery packs in parallel. In this case, assuming that one of the two battery packs contains 30% charge amount of full charge, and the other battery pack contains 90% charge amount of full charge, the portable power supply 100 can output 1000 W power only until the battery pack containing 30% charge amount is depleted.

When the charge amount of the two battery packs are equalized to 60% charge amount which is the average charge amount of the two battery packs, the portable power supply 100 can output 1000 W power for twice the period of time compared to the case without equalizing the charge amounts. That is, the use of the portable power supply 100 allows extension of operating time in a power outage or the like for an external electric apparatus which consumes much power.

Note that in the example in FIG. 7, the charge/discharge control unit 253 performs charging control by charging the battery pack 202 with the power of battery pack 201 containing a higher charge amount. However, for example, if a portable power supply capable of holding three or more battery packs is used, it is possible to use power of one or more battery packs each containing a charge amount more than an average amount of the charge amounts among the three or more battery packs, to charge one or more battery packs each containing a charge amount less than the average amount.

In addition, the charge/discharge control unit 253 does not have to equalize charge amounts of a plurality of battery packs. If the charge/discharge control unit 253 reduces the difference between the charge amounts of the battery packs, the portable power supply 100 allows extension of operating time of an external electric apparatus which consumes much power.

Next, another example of equalizing process of the charge/discharge control unit 253 will be described.

The equalizing process described with reference to FIG. 8 is started by using a request for control by a user to the reception unit 120 as a trigger. However, the equalizing process may be started automatically by considering connection of the battery packs to the connection units 40 as a trigger.

Furthermore, the equalizing process may be performed while supplying power to a load (external electric apparatus) connected to the power supplying unit 50.

Figure 9:
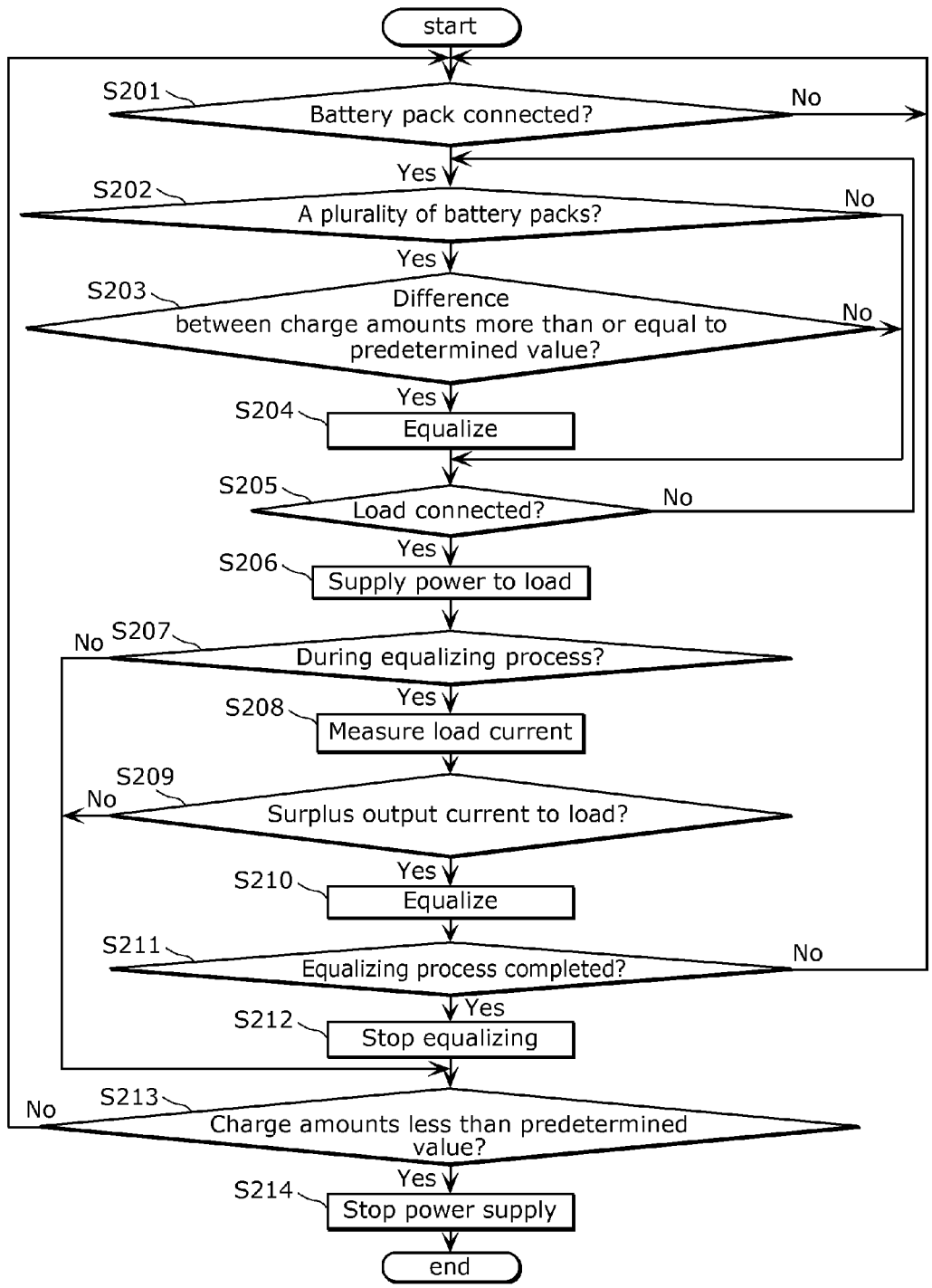
FIG. 9 is a flowchart illustrating another example of the equalizing process.

FIG. 9 is a flowchart illustrating another example of the equalizing process as described above. Note that the following descriptions of FIG. 9 may omit the matters which have been described with reference to FIG. 8.

First, the charge/discharge control unit 253 determines whether or not a battery pack is connected to the connection unit 40 (S201). When a battery pack is not connected to the connection unit 40 (No in S201), the charge/discharge control unit 253 continues to monitor whether or not a battery pack is connected to the connection unit 40.

When a battery pack is connected to the connection unit 40 (Yes in S201), the charge/discharge control unit 253 determines whether a single or a plurality of battery packs are connected to the connection units 40 (S202).

When a plurality of battery packs are connected to the connection units 40 (Yes in S202), the charge/discharge control unit 253 detects a charge amount of each of the battery packs (S203). When difference between the charge amounts of the battery packs is more than or equal to a predetermined value (Yes in S203), the charge/discharge control unit 253 equalizes the charge amounts (S204). The predetermined value mentioned above is a threshold value for starting the equalizing process and the threshold value is determined in designing. Note that Step S203 may be omitted.

Next, the charge/discharge control unit 253 detects whether or not a load is connected to the power supplying unit 50 (S205). The process in Step S205 is also performed when the equalizing process is not performed (No in S202 or S203).

When a load is not connected to the power supplying unit 50 (No in S205), the charge/discharge control unit 253 performs the processes of Steps S202 to S204 without supplying power to a load. That is, the charge/discharge control unit 253 continues the equalizing process.

When a load is connected to the power supplying unit 50 (Yes in S205), the charge/discharge control unit 253 supplies power to the load (S206).

When the equalizing process is being performed (Yes in S207) at this time, the charge/discharge control unit 253 measures a load current (S208), and determines whether or not there is a surplus output current to the load (S209). When there is a surplus output current to the load (Yes in S209), the equalizing process is performed while supplying power to the load (S210). The case where there is a surplus output current to the load is the case where the load current is smaller than a maximum continuous current suppliable from the battery packs to the load, and the equalizing process can be performed with the power which does not contribute to the power supply to the load.

When the equalization of the charge amounts between the battery packs is not completed (No in S211), the charge/discharge control unit 253 performs the processes of Steps S201 to S210.

When the equalization of the charge amounts between the battery packs is completed (Yes in S211), the charge/discharge control unit 253 stops the equalizing process (S212).

When the equalizing process is completed (No in S207 or Yes in S211), or when the equalizing process is not performed because there is not a surplus output current (No in S209), the charge/discharge control unit 253 continues to supply power to the load.

When the charge amounts of the battery packs are more than a predetermined value and the power supply to the load can be continued (No in S213), the charge/discharge control unit 253 performs the processes of Steps S201 to S212. Note that the predetermined value is determined based on the power to be consumed by the load and within the limits of the charge amounts of the battery packs for enabling stable driving of the load.

When the charge amounts of the battery packs are less than the predetermined value and continuing the power supply to the load is impossible (Yes in S213), the charge/discharge control unit 253 stops supplying power to the load (S214).

As described above, the equalizing process may be started automatically by considering the connection of the battery packs to the connection units 40 as a trigger, or performed while supplying power to the load connected to the power supplying unit 50.

By doing so, the difference can be reduced between the charge amounts of the battery packs connected to the portable power supply 100 while also supplying power to the load, and duration for which outputting high power is possible can be extended.

[3-2. Switching Control]

Next, switching control for the switching unit 270 in the charge/discharge control unit 253 will be described.

The portable power supply 100 can be used for a power supply of a commercial system (outlet) for normal times by connecting the power plug 70 to the commercial system. The portable power supply 100 can be used as a power supply also in an emergency when the power supply from the commercial system is stopped due to a power outage, by using the power of battery packs.

Figure 10:
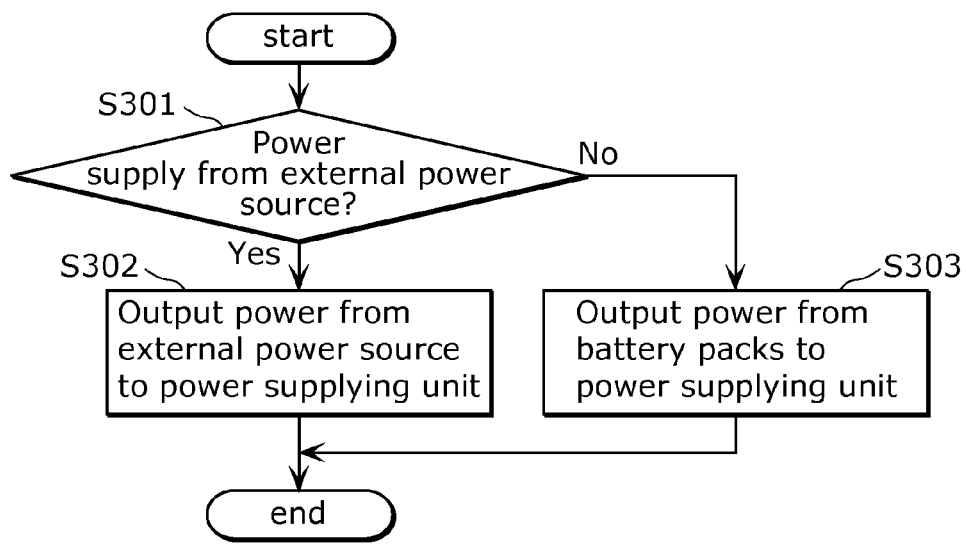
FIG. 10 is a flowchart illustrating a process of controlling a switching unit.

FIG. 10 is a flowchart illustrating a process of controlling the switching unit 270 by the charge/discharge control unit 253.

First, the charge/discharge control unit 253 detects whether or not power is supplied from an external power source to the portable power supply 100 (S301). Note that when "power is not supplied to the portable power supply 100 from an external power source" includes both cases where the power plug 70 is unplugged from an outlet and where the portable power supply 100 is not supplied with power due to a power outage or the like, although the power plug 70 is plugged to an outlet.

When the portable power supply 100 is supplied with power from an external power source (Yes in S301), the charge/discharge control unit 253 controls the switching unit 270 to output the power supplied from the external power source to the power supplying unit 50 (load) (S302). Here, battery packs may be connected to the connection units, but do not have to be connected to the connection units. Furthermore, when battery packs are connected to the connection units, the battery packs may be charged with the power supplied from the external power source.

When the portable power supply 100 is not supplied with power from an external power source (No in S301), the charge/discharge control unit 253 controls the switching unit 270 to output the power charged in the battery packs to the power supplying unit 50 (S303).

Such control allows the power supplied from the external power source to be automatically output to the power supplying unit 50, when the power supply to the portable power supply 100 from the external power source is stopped and then resumed.

Note that the charge/discharge control unit 253 may switch the power sources for supplying power to the power supplying unit 50 in accordance with the charge amounts of the battery packs.

Figure 11:
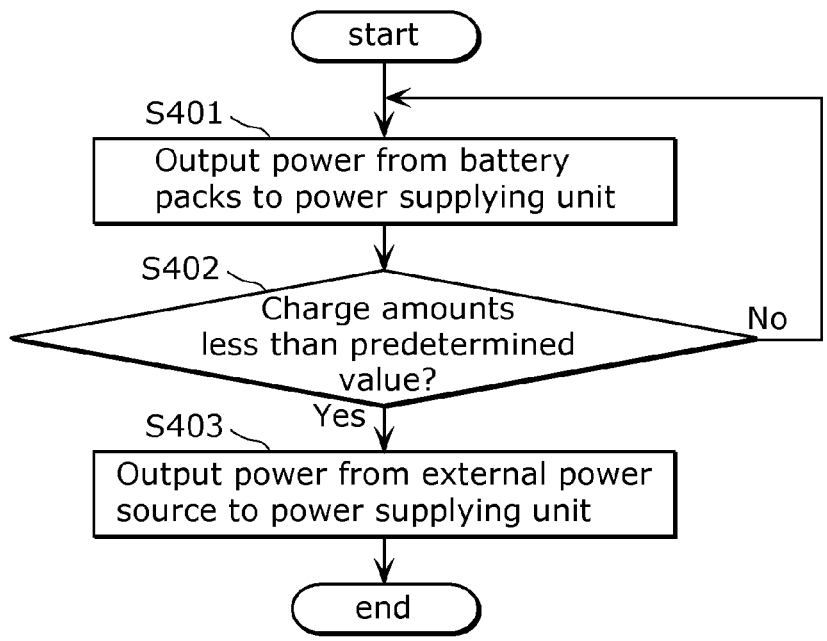
FIG. 11 is a flowchart illustrating control of switching of the switching unit in accordance with charge amounts of battery packs).

FIG. 11 is a flowchart illustrating control of switching of the power sources in accordance with charge amounts of battery packs.

When the power charged in the battery packs is output to the power supplying unit 50 (S401), the charge/discharge control unit 253 detects the charge amounts of the battery packs (S402). Specifically, the charge amounts of the battery packs are detected with signals from the terminal 221c and the terminal 222c of the battery packs which are described with reference to FIG. 4.

When the charge amounts of the battery packs are more than or equal to a predetermined value (No in S402), the charge/discharge control unit 253 controls the switching unit 270 to output the power charged in the battery packs to the power supplying unit 50. Here, the predetermined value is determined based on the power to be consumed by the load connected to the power supplying unit 50 and within the limits of the charge amounts of the battery packs for enabling stable driving of the load.

When the charge amounts of the battery packs are less than the predetermined value (Yes in S402), the charge/discharge control unit 253 controls the switching unit 270 to output, to the power supplying unit 50, the power supplied from the external power source to which the power plug 70 is connected.

As described above, the charge/discharge control unit 253 switches the power sources in accordance with the charge amounts of the battery packs. This enables the portable power supply 100 to supply power to the load even when the charge amounts of the battery packs are decreased.

Embodiment 2

In Embodiment 2, descriptions are given of a portable power supply provided with a mode switch (input reception unit) for switching operation modes of the portable power supply by a user.

Figure 12:
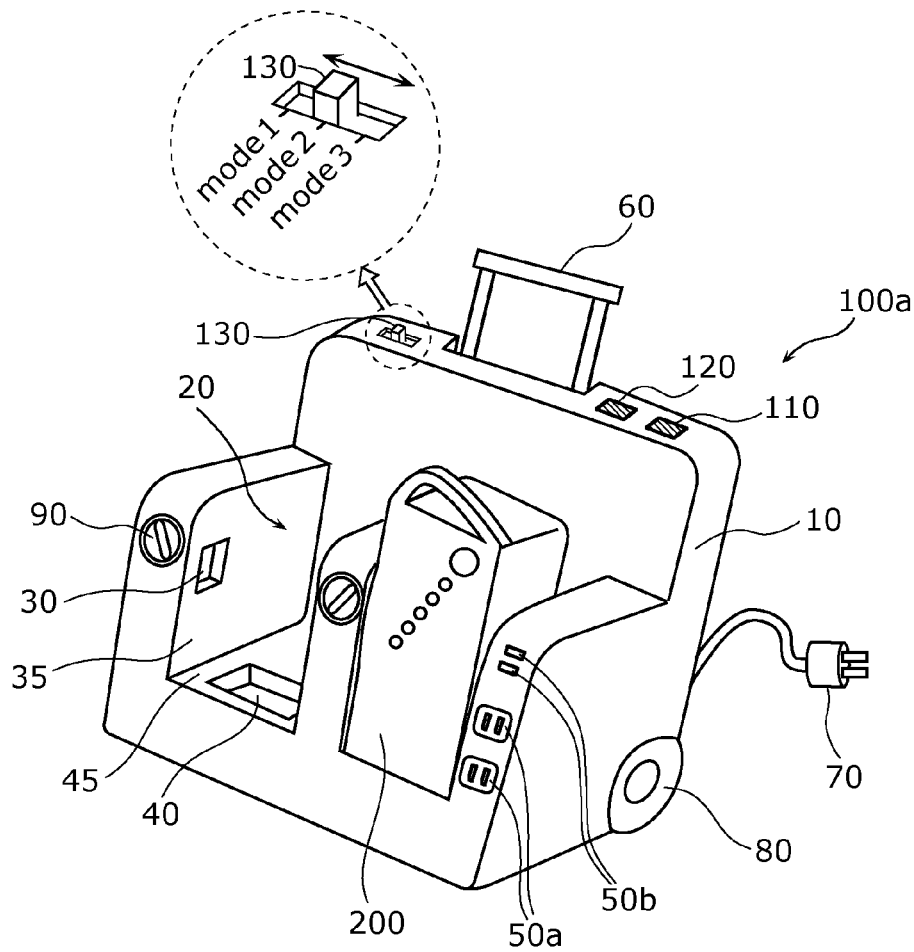
FIG. 12 illustrates an external view of a portable power supply according to Embodiment 2.

FIG. 12 illustrates an external view of the portable power supply according to Embodiment 2. FIG. 13 is a table for describing each mode of the portable power supply according to Embodiment 2.

Note that "Discharge" in FIG. 13 means discharging the power charged in the battery pack 201 and the battery pack 202, i.e., outputting the first power to the power supplying unit 50. "No discharge" means not discharging the power charged in the battery packs 201 and 202, i.e., not outputting the first power to the power supplying unit 50.

As illustrated in FIG. 12, a portable power supply 100a according to Embodiment 2 includes a mode switch 130. Note that the portable power supply 100a is the same as the portable power supply 100 except for the mode switch 130, and thus the difference is mainly discussed in Embodiment 2 below.

The mode switch 130 is a so-called slide switch, and a user can switch operation modes with the mode switch 130.

In Embodiment 2, the operation modes of the portable power supply 100a include three operation modes: a mode 1, a mode 2, and a mode 3. Firstly, the mode 1 is described.

When the mode 1 is selected by a user with the mode switch 130, the switching unit 270 outputs the first power (the power converted by the discharge unit 260) to the power supplying unit 50. That is, the switching unit 270 performs switching in accordance with the input by the user (input to the mode switch). When the input by the user indicates the mode 1, the switching unit 270 outputs the first power to the power supplying unit 50. In the mode 1, the power is output to the power supplying unit 50 via the routes 140 in FIG. 5 in the same manner as in Embodiment 1.

The mode 1 is a mode in which the portable power supply 100a operates as a power supply even when the power plug 70 is not connected to an external power source. A user selects the mode 1 when the user desires to use the portable power supply 100a outdoors or during a period of time that the power rate to be charged by the commercial system is high.

Note that as illustrated in FIG. 13, the mode 1 is a mode for outputting the power of the battery pack 201 and the battery pack 202 to the power supplying unit 50, and thus the battery pack 201 and the battery pack 202 are not basically charged in the mode 1.

Next, the mode 2 will be described.

When the mode 2 is selected by a user with the mode switch 130, the switching unit 270 outputs the second power (the power supplied via the power plug 70) to the power supplying unit 50. That is, the switching unit 270 performs switching in accordance with the input by the user (input to the mode switch 130). When the input by the user indicates the mode 2, the switching unit 270 outputs the second power to the power supplying unit 50. In the mode 2, the power is output to the power supplying unit 50 via the routes 170 in FIG. 6 in the same manner as in Embodiment 1.

Note that as illustrated in FIG. 13, in the mode 2, the charge units 281 and 282 can charge the battery packs 201 and 202 except for at the time of a power outage (when power is not supplied via the power plug 70).

The mode 2 is a mode for outputting the power supplied from the power plug 70 directly to the power supplying unit 50. The user selects the mode 2 when the user desires to use the portable power supply 100a as a battery charger for the battery packs 201 and 202, or to use the portable power supply 100a as a storage space for the battery packs 201 and 202.

Next, the mode 3 is described. In the mode 3, when the power plug 70 is not connected to an external power source or when a power outage occurs, the switching unit 270 automatically switches in the same manner as in the switching control described in Embodiment 1 based on whether or not power is supplied from an external power source to the portable power supply 100a.

When the user selects the mode 3 with the mode switch 130 and power is not supplied from an external power source to the portable power supply 100a, the switching unit 270 outputs the first power to the power supplying unit 50. When power is supplied from an external power source to the portable power supply 100a, the switching unit 270 outputs the second power to the power supplying unit 50. That is, in the mode 3, the switching unit 270 basically outputs the second power to the power supplying unit 50, but when power is not received from the power plug 70, the switching unit 270 outputs the first power to the power supplying unit 50.

Note that the charge/discharge control unit 253 may detect whether or not the power plug 70 is connected to an outlet, i.e., whether or not the portable power supply 100a is supplied with power from an external power source as in Embodiment 1, or the switching unit 270 may perform the detection by itself. Whether or not power is supplied from an external power source can be detected by monitoring the power in the control circuit.

The mode 3 may be used for the following applications. For example, a user connects, to the power supplying unit 50, an apparatus to which the user desires to continue supplying power even at the time of a power outage, and selects the mode 3. By doing so, the apparatus is automatically supplied with power (the first power) even at the time of a power outage.

Note that as illustrated in FIG. 13, in the mode 3, the charge units 281 and 282 can charge the battery packs 201 and 202 except for at the time of a power outage (when power is not supplied via the power plug 70).

Note that the switch for switching the operation modes is not limited to the slide switch as described above, and may be any input interface capable of receiving an input indicating an operation mode by a user, for example, a touch panel.

In Embodiment 2, switching is performed between three operational modes, but the switch may be any switch, provided that the switch has a configuration for enabling switching at least between two operation modes out of the three operational modes.

Note that the portable power supply 100*a* may include a time measurement unit, and the switching unit 270 may perform switching based on the time measured by the time measurement unit. The time measurement unit is specifically a so-called real time clock or the like, i.e., a time source capable of obtaining current time.

When the portable power supply 100*a* includes the time measurement unit, the switching unit 270 can perform the following switching.

For example, the switching unit 270 outputs the first power to the power supplying unit during the period of time that power demand on the commercial system is high (a predetermined time period). In contrast, the switching unit 270 outputs the second power to the power supplying unit 50 during the period of time that power demand on the commercial system is low (a time period other than the predetermined time period stated above).

Such switching enables a user to easily adjust the amount of power to be used, which is called peak shifting.

Furthermore, for example, the switching unit 270 may output the first power to the power supplying unit during the period of time that the power rate to be charged by the commercial system is high, and output the second power to the power supplying unit 50 the power rate to be charged by the commercial system is low.

Such switching allows a user to save costs for power.

Note that the predetermined time period mentioned above is set, for example, by a user through an input interface provided to the portable power supply 100*a*.

(Modifications)

The foregoing has described embodiments, but those embodiments do not limit the scope of the present invention.

A specific electric apparatus in the foregoing embodiments is described as a power-assisted bicycle, but the specific electric apparatus is not limited to the power-assisted bicycle. The specific electric apparatus may be any electric apparatus which uses a battery pack, for example, a power drill and an electric tool.

Although a plurality of battery packs are connected to the portable power supply in the foregoing embodiments, a single battery pack may be connected to the portable power supply.

Figure 14:
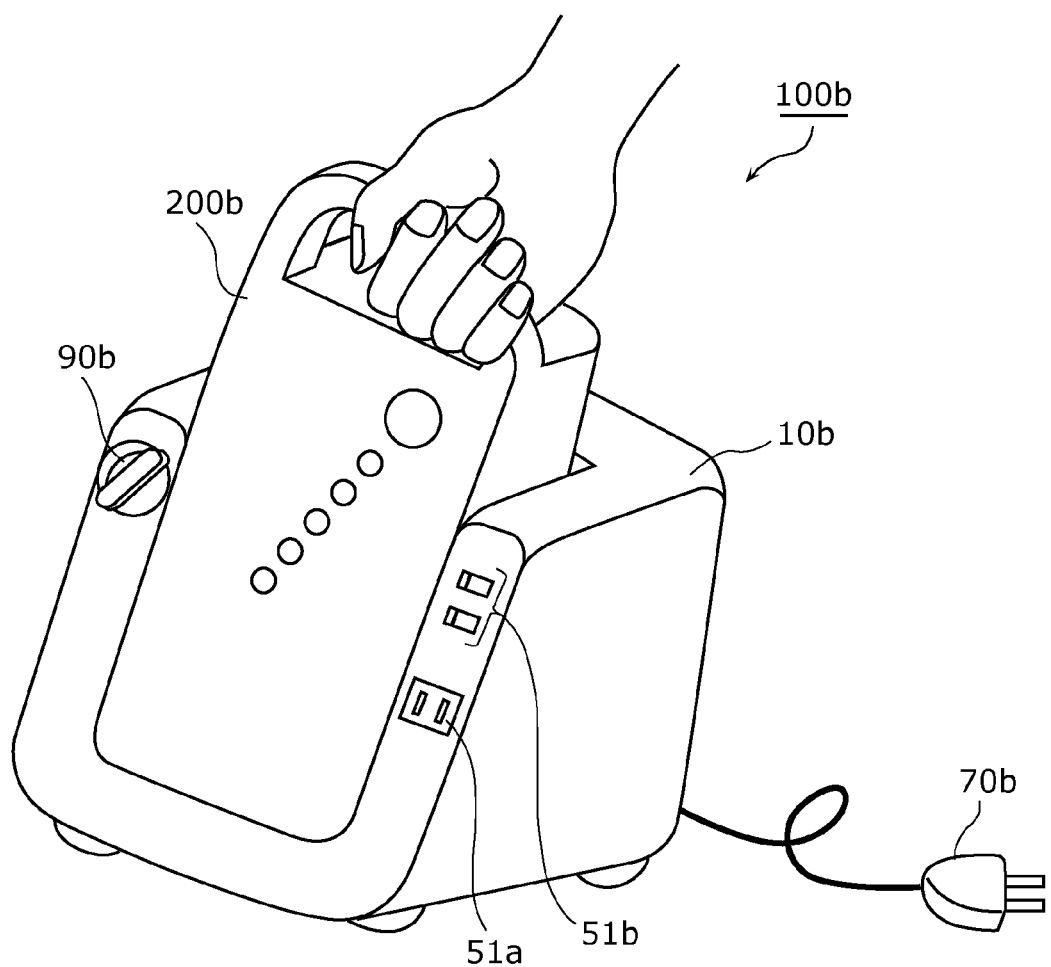
FIG. 14 is an external view of a portable power supply to which a single battery pack is connected.

FIG. 14 is an external view of the portable power supply to which a single battery pack is connected.

As illustrated in FIG. 14, the portable power supply 100*b* includes: a case 10*b*, a holding unit provided on the case 10*b*, an outlet 51*a* and a USB socket 51*b*, a power plug 70*b*, and a fixing unit 90*b*. The holding unit includes a fitting unit and a connection unit, and the case 10*b* includes a discharge unit therein, although they are not illustrated in the drawing.

The portable power supply 100*b* illustrated in FIG. 14 does not have a handle unit like the portable power supply 100. The handle of the battery pack 200*b* as it is also works as a handle unit of the portable power supply 100*b*. With this, the portable power supply 100*b* can be realized at low costs.

As described above, the present invention can be realized even with a simple configuration.

The portable power supply may have a display unit to display charge amounts (residual power amounts) of the battery packs and duration that power supply to an external electric apparatus connected to the power supplying unit is possible.

Figure 15:
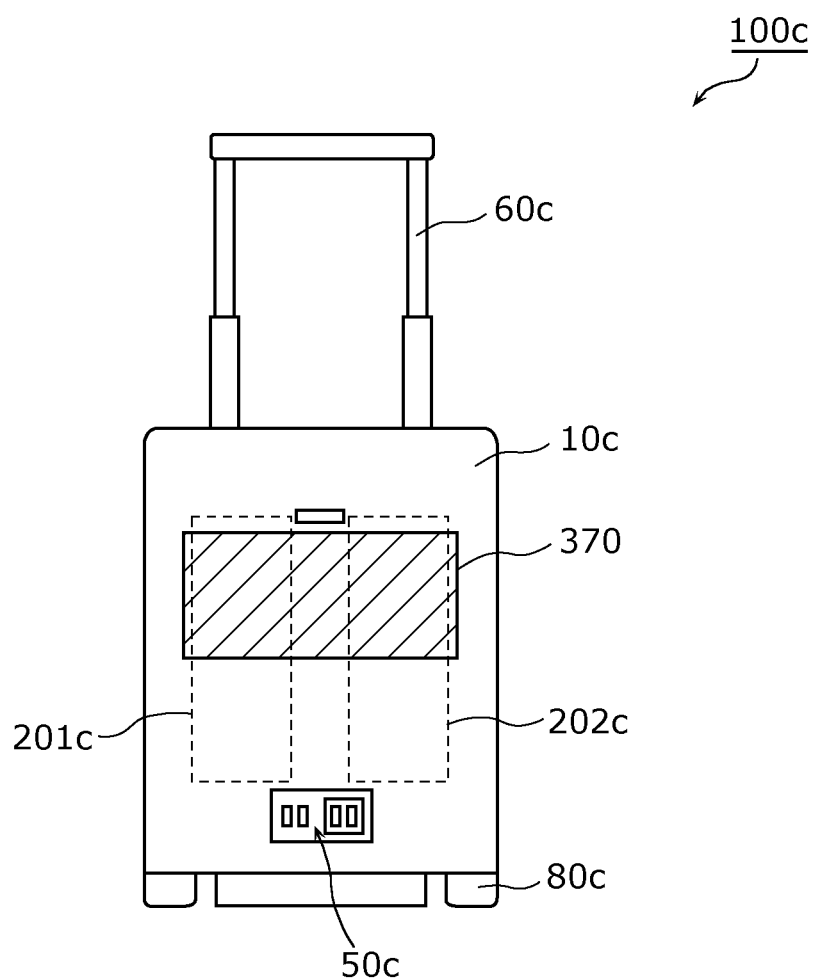
FIG. 15 is an external view of the portable power supply including a display unit.

FIG. 15 is an external view of a portable power supply including a display unit.

As illustrated in FIG. 15, the portable power supply 100*c* includes a case 10*c*, two holding units provided on the case 10*c*, a power supplying unit 50*c*, a display unit 370, a handle unit 60*c*, and a caster 80*c*. Two holding units each include a fitting unit and a connection unit provided thereto. Battery packs 201*c* and 202*c* are held in the holding units.

A control circuit provided inside the case 10*c* includes a discharge unit, a memory unit, and a display control unit (detection unit). The circuit block diagram of the control circuit is the same circuit block diagram illustrated in FIG. 4, except for the display unit 370, the memory unit, and the display control unit.

Examples of the display unit 370 include a liquid crystal display (LCD) and an organic light emitting display (OLED).

The memory unit stores information on an amount of power necessary for operating an external electric apparatus connected to the power supplying unit 50*c*. The memory unit is a recording medium such as a semiconductor memory and a hard disk drive (HDD).

The display control unit detects charge amounts of the battery packs 201*c* and 202*c*, and displays, on the display unit, the charge amounts (residual amounts of power) of the battery packs and duration that power supply is possible to an external electric apparatus connected to the power supplying unit 50*c*. The display control unit may be implemented with a semiconductor apparatus, for example. The display control unit may be configured by using only hardware, as well as combining hardware and software. The display control unit may be implemented as a part of the functions of the charge/discharge control unit 253 described the in embodiments.

Figure 16:
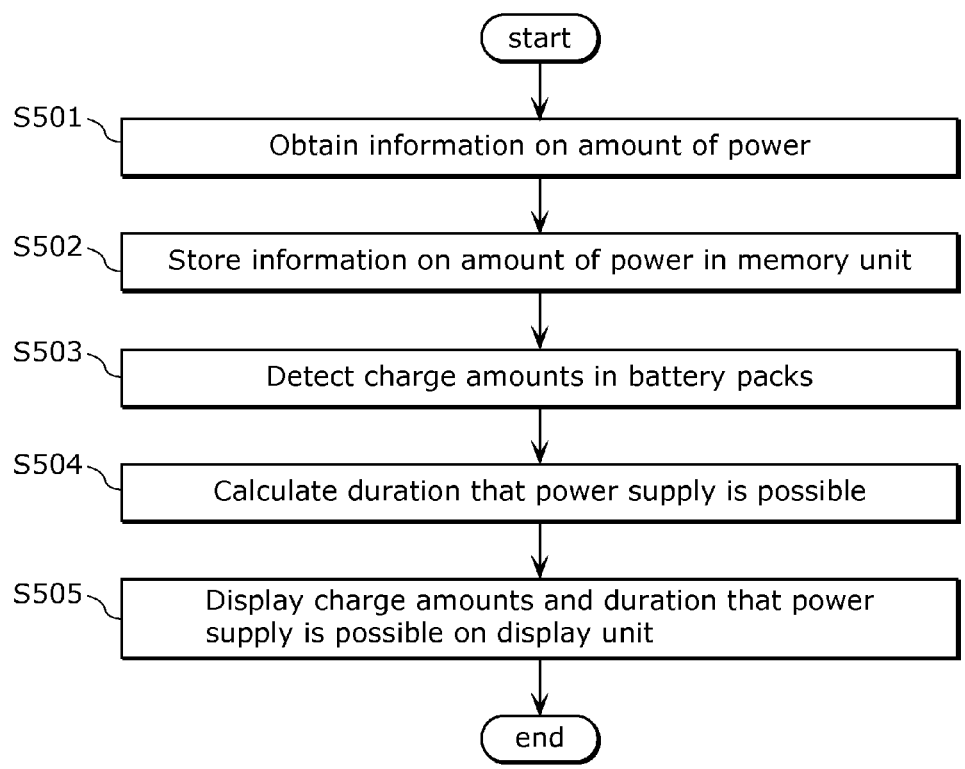
FIG. 16 is a flowchart of display control by the display control unit.

FIG. 16 is a flowchart of display control by the display control unit.

First, the display control unit obtains information on an amount of power necessary for operating an external electric apparatus (S501). Specifically, the display control unit measures the load current of the external electric apparatus connected to the power supplying unit 50 by using a circuit for measuring current which is provided in the switching unit 270.

Next, the display control unit stores information on the amount of power in the memory unit (S502).

Then, the display control unit detects (obtains) the charge amounts in the battery packs 201c and 202c (S503). Specifically, as described with reference to FIG. 4, the display control unit detects the charge amounts in the battery packs 201c and 202c by using signals transmitted from the terminals which are provided on the battery packs 201c and 202c for notifying the charge amounts of the battery packs 201c and 202c.

Next, the display control unit calculates duration that power supply is possible to the external electric apparatus based on the amount of power necessary for operating the external electric apparatus and on the charge amounts of the battery packs 201c and 202c (S504).

Lastly, the display control unit displays, on the display unit, the charge amounts of the battery packs and the duration that power supply is possible to the external electric apparatus connected to the power supplying unit (S505).

With this, a user can know the charge amounts and the duration that power supply is possible to the external apparatus by checking the display unit.

The present invention also includes the followings.

(1) Specifically, each apparatus described above may be achieved by a computer system which includes a microprocessor, a ROM, a RAM, a hard disk unit, a display unit, a keyboard, a mouse, and the like. A computer program is stored in the RAM or the hard disk unit. The operation of the microprocessor in accordance with the computer program allows each apparatus to achieve its functionality. Here, the computer program includes a combination of instruction codes indicating instructions to a computer in order to achieve given functionality.

(2) Some or all of structural elements included in each apparatus described above may include a single system large scale integration (LSI: large scale integrated circuit). The system LSI is a super multi-function LSI manufactured by integrating multiple components into one chip, and is specifically a computer system configured so as to include a microprocessor, a ROM, a RAM, and so on. A computer program is stored in the ROM. The system LSI accomplishes its functions by the microprocessor loading the computer program from the ROM to the RAM and performing operations such as computing in accordance with the loaded computer program.

(3) Some or all of structural elements included in each apparatus described above may include an IC card or a single module which is detachable to the apparatus. The IC card or the module is a computer system which includes a microprocessor, a ROM, a RAM, and the like. The above super-multifunctional LSI may be included in the IC card or the module. The operation of the microprocessor in accordance with the computer program allows the IC card or the module accomplishes to achieve its functionality. This IC card or module may have tamper resistant properties.

(4) The present invention may be achieved by the methods described above. In addition, these methods may be achieved by a computer program implemented by a computer, or may be implemented by a digital signal which includes a computer program.

The present invention may be achieved by a computer program or a digital signal stored in a computer-readable recording medium such as a flexible disk, a hard disk, CD-ROM, MO, DVD, DVD-ROM, DVD-RAM, a blue-ray disc (BD), and a semiconductor memory. Alternatively, the present invention may be achieved by a digital signal stored in such a recording medium.

With the present invention, the computer program or the digital signal may be transmitted via, for instance, data broadcasting or a network typified by electric telecommunication lines, wireless or wired communication lines, and the Internet.

The present invention may be a computer system which includes a microprocessor and a memory, the memory may have stored therein a computer program, and the microprocessor may operate in accordance with the computer program.

Another independent computer system may implement a program or a digital signal transported being stored in a recording medium, or a program or a digital signal transported via a network or the like.

(5) The above embodiments and the above modifications may be combined.

Although the above is descriptions of the power supply apparatus (portable power supply) according to one or more aspects of the present invention based on the embodiments, the present invention is not limited to the embodiments. Various modifications to the embodiments that may be conceived by those skilled in the art and combinations of constituent elements in different embodiments may be included within the scope of one or more aspects of the present invention, without departing from the spirit of the present invention.

The present invention is useful for a portable power supply to use a battery pack for a specific electric apparatus as a power supply for different types of external electric apparatus other than the specific electric apparatus.

REFERENCE SIGNS LIST 10, 10b, 10c Case
20 Holding unit
30 Fitting unit
35 Side unit
40 Connection unit
45 Base unit
50, 50c Power supplying unit
50a, 51a Outlet
50b, 51b USB socket
60, 60c Handle unit
70, 70b Power plug
80, 80c Caster
90, 90b Fixing unit
100, 100a, 100b, 100c Portable power supply (Power supply apparatus)
110 Switch
120 Reception unit
130 Node switch (Input reception unit)
140, 150, 160, 170 Route
200, 200b, 201, 201c, 202, 202c Battery pack
205 Body
210 Attachment unit
220 Terminal unit
221a to 221e, 222a to 222e Terminal
230 Charge amount indication unit
240 Charge amount indication button
250 Handle
251, 252 Storage control unit
253 Charge/discharge control unit
260 Discharge unit (Power conversion unit)
270 Switching unit
281, 282 Charge unit
291, 292 DC/DC converter
301, 302 Battery
310 PV panel
320 Connection box 330 Power conditioning system
340 Electric fan
350 Distribution switchboard
360 Fuel cell system
370 Display unit

The invention claimed is:

1. A power supply apparatus which supplies power to an external apparatus by using a battery pack, the power supply apparatus comprising:
   a connector to which the battery pack is connected, the battery pack being electrically connectable to another apparatus and being detached from the other apparatus when connected to the connector;
   a power receiver configured to receive power supplied from an external power source of a type different from a type of the battery pack;
   an outlet configured to supply power to the external apparatus via a power receiver of the external apparatus through connection of the power receiver of the external apparatus to the outlet; and
   a switching circuit configured to switch between (i) outputting, to the outlet, first power which is the power output from a terminal of the battery pack via the connector and (ii) outputting, to the outlet, second power which is the power supplied from the external power source via the power receiver of the power supply apparatus.

2. The power supply apparatus according to claim 1,
   wherein the terminal of the battery pack is a terminal which supports a specific apparatus, and
   the power supply apparatus supplies power to the external apparatus through connection of the terminal of the battery pack to the connector, the battery pack being used for supplying power to the specific apparatus.

3. The power supply apparatus according to claim 1, wherein when the terminal of the battery pack is not connected to the connector, the switching circuit is configured to switch to output the second power to the outlet.

4. The power supply apparatus according to claim 1, further comprising
   a charger configured to supply the second power to the battery pack to charge the battery pack with the second power when the terminal of the battery pack is connected to the connector.

5. A power supply apparatus which supplies power to an external apparatus by using a battery pack, the power supply apparatus comprising:
   a connector to which the battery pack is connected, the battery pack being electrically connectable to another apparatus and being detached from the other apparatus when connected to the connector;
   a power receiver configured to receive power supplied from an external power source of a type different from a type of the battery pack;
   a first power supply configured to supply power to the external apparatus via a power receiver of the external apparatus through connection of the power receiver of the external apparatus to the first power supply;
   a switching circuit configured to switch between (i) outputting, to the first power supply, first power which is the power output from a terminal of the battery pack via the connector and (ii) outputting, to the first power supply, second power which is the power supplied from the external power source via the power receiver of the power supply apparatus; and
   an input receiver configured to receive an input from a user,
   wherein when the input received by the input receiver indicates a mode 1 and the terminal of the battery pack is connected to the connector, the switching circuit is configured to output the first power to the first power supply regardless of whether or not power is supplied from the external power source to the power supply apparatus.

6. The power supply apparatus according to claim 5, further comprising
   a charger configured to supply the second power to the battery pack to charge the battery pack with the second power when the terminal of the battery pack is connected to the connector,
   wherein when the input received by the input receiver indicates the mode 1, the charger is configured not to charge the battery pack with the second power even when power is supplied from the external power source to the power supply apparatus.

7. The power supply apparatus according to claim 5,
   wherein when the input received by the input receiver indicates a mode 2 and power is supplied from the external power source to the power supply apparatus, the switching circuit is configured to output the second power to the first power supply even when the terminal of the battery pack is connected to the connector.

8. The power supply apparatus according to claim 7,
   wherein when the input received by the input receiver indicates the mode 2 and power is not supplied from the external power source to the power supply apparatus, the switching circuit is configured not to output the first power to the first power supply even when the terminal of the battery pack is connected to the connector.

9. The power supply apparatus according to claim 5,
   wherein when the input received by the input receiver indicates a mode 3, the switching circuit is configured to (i) output the first power to the first power supply in a case where power is not supplied from the external power source to the power supply apparatus, and (ii) output the second power to the first power supply in a case where power is supplied from the external power source to the power supply apparatus.

10. The power supply apparatus according to claim 1,
    wherein the battery pack further includes a charge amount indicator configured to indicate a charge amount which is an amount of power charged in the battery pack, and
    the terminal of the battery pack is connected to the connector such that the charge amount indicator is viewable from outside the power supply apparatus.

11. The power supply apparatus according to claim 1, further comprising
    a plurality of the connectors to each of which the terminal of the battery pack is connected.

12. A power supply apparatus which supplies power to an external apparatus by using a battery pack, the power supply apparatus comprising:
    a connector to which the battery pack is connected, the battery pack being electrically connectable to another apparatus and being detached from the other apparatus when connected to the connector;
    a power receiver configured to receive power supplied from an external power source of a type different from a type of the battery pack;
    a first power supply configured to supply power to the external apparatus via a power receiver of the external apparatus through connection of the power receiver of the external apparatus to the first power supply;

a switching circuit configured to switch between (i) outputting, to the first power supply, first power which is the power output from a terminal of the battery pack via the connector and (ii) outputting, to the first power supply, second power which is the power supplied from the external power source via the power receiver of the power supply apparatus;

a plurality of the connectors to each of which the terminal of the battery pack is connected;

a detector configured to detect charge amounts of a plurality of the battery packs each of which is connected to the detector via a different one of the connectors; and a charge controller configured to perform charging control by using power of at least one of the battery packs that contains a charge amount more than an average amount of the charge amounts detected by the detector to charge a different at least one of the battery packs.

13. The power supply apparatus according to claim 12, wherein the charge controller is configured to perform the charging control to equalize the charge amounts of the battery packs.

14. The power supply apparatus according to claim 12, wherein the detector is further configured to detect load current to be supplied to the external apparatus from the battery packs via the first power supply, and the charge controller is configured to perform the charging control when the load current is smaller than a maximum continuous current suppliable from the battery packs to the external apparatus.

15. The power supply apparatus according to claim 1, further comprising a switching controller configured to control the switching circuit based on the charge amounts of the battery packs, wherein when the power charged in the battery packs is being output to the outlet, the switching controller is configured to control the switching circuit to output the second power to the outlet in a case where the charge amounts of the battery packs are less than a predetermined value.

16. The power supply apparatus according to claim 1, further comprising a switching controller configured to control the switching circuit based on an amount of power to be supplied from the external power source, wherein the switching controller is configured to control the switching circuit to output the first power to the outlet when power supply from the external power source to the power supply apparatus is stopped.

17. The power supply apparatus according to claim 16, wherein the switch controller is configured to control the switching circuit to output the second power to the outlet when the power supply from the external power source to the power supply apparatus is stopped and then resumed.

18. The power supply apparatus according to claim 1, further comprising a DC/AC inverter which converts the first power to alternating current power, wherein the outlet is an outlet to which the first power converted into the alternating current power is output.

19. The power supply apparatus according to claim 1, further comprising:

a DC/DC converter which converts the first power; and a USB port to which the first power converted by the DC/DC converter is output.

20. The power supply apparatus according to claim 1, further comprising:

a display;

a memory configured to store information on an amount of power necessary for operating the external apparatus;

a detector configured to detect a charge amount of the battery pack; and a display controller configured to cause the display to display a duration that power supplied from the battery packs to the external apparatus is possible based on the charge amount of the battery pack and the amount of power necessary for operating the external apparatus.

21. The power supply apparatus according to claim 1, wherein the other apparatus includes a power-assisted vehicle and an electric tool, and the external apparatus is a refrigerator, an electric fan, a personal computer, or a television set.

22. The power supply apparatus according to claim 1, further comprising a timer configured to measure time, wherein the switching circuit is configured to switch the outputting depending on the time measured by the timer.

23. The power supply apparatus according to claim 1, further comprising a receiver configured to receive an instruction for switching between (i) outputting the first power to the outlet and (ii) outputting the second power to the outlet.

24. The power supply apparatus according to claim 1, wherein the external power source of the type different from the type of the battery pack is an alternating-current external power source.

25. The power supply apparatus according to claim 1, wherein the external power source of the type different from the type of the battery pack is a commercial system power source.

26. The power supply apparatus according to claim 1, wherein the external power source of the type different from the type of the battery pack is a self-generating power source.

27. The power supply apparatus according to claim 1, further comprising:

a power converter which converts direct current power output from the battery pack via the connector; and a second power supply to which the direct current power converted by the second power converter is output.

28. The power supply apparatus according to claim 27, wherein the second power supply is a USB (universal serial bus) port.

29. The power supply apparatus according to claim 1, wherein the switching circuit is configured to switch between (i) outputting the first power to the outlet, and (ii) directly outputting the second power to the outlet.

* * * * *